US010120505B2

(12) United States Patent
Mizunuma et al.

(10) Patent No.: US 10,120,505 B2
(45) Date of Patent: *Nov. 6, 2018

(54) PROJECTION AND OPERATION INPUT DETECTION DEVICE, METHOD AND PROGRAM

(71) Applicant: Sony Corporation, Tokyo (JP)

(72) Inventors: Hiroyuki Mizunuma, Tokyo (JP); Ikuo Yamano, Tokyo (JP); Shunichi Kasahara, Kanagawa (JP); Ken Miyashita, Tokyo (JP); Kazuyuki Yamamoto, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,059

(22) Filed: Jun. 21, 2017

(65) Prior Publication Data

US 2017/0285876 A1 Oct. 5, 2017

Related U.S. Application Data

(63) Continuation of application No. 14/940,254, filed on Nov. 13, 2015, now Pat. No. 9,727,173, which is a (Continued)

(30) Foreign Application Priority Data

Mar. 30, 2011 (JP) ................................ 2011-075998

(51) Int. Cl.
*G06F 3/042* (2006.01)
*G06F 3/0486* (2013.01)
(Continued)

(52) U.S. Cl.
CPC .......... *G06F 3/0425* (2013.01); *G03B 17/54* (2013.01); *G06F 3/0482* (2013.01);
(Continued)

(58) Field of Classification Search
None
See application file for complete search history.

(56) References Cited

U.S. PATENT DOCUMENTS 8,325,234 B2 * 12/2012 Kii ........................ G06F 3/038
 345/633
9,223,443 B2 * 12/2015 Mizunuma ............ G06F 3/0425
(Continued)

FOREIGN PATENT DOCUMENTS

JP 2005-338379 A 12/2005
WO 2010017696 A1 2/2010

OTHER PUBLICATIONS

Chinese Office Action for Application No. 201210079745.2 dated Mar. 23, 2016.

*Primary Examiner* — David D Davis
(74) *Attorney, Agent, or Firm* — Lerner, David, Littenberg, Krumholz & Mentlik, LLP

(57) ABSTRACT

According to an illustrative embodiment, an information processing apparatus is provided. The apparatus is used for processing a first image projected toward a target. The apparatus includes a processing unit for detecting that an object exists between a projector unit and the target, wherein when an object exists between the projector unit and the target, the apparatus determines an area of the object and generates a modified first image, based on the area of the object, for projection toward the target.

18 Claims, 18 Drawing Sheets

Related U.S. Application Data continuation of application No. 13/428,414, filed on Mar. 23, 2012, now Pat. No. 9,223,443.

(51) Int. Cl.
  *G06F 3/0481* (2013.01)
  *H04N 9/31* (2006.01)
  *G03B 17/54* (2006.01)
  *G06F 3/0488* (2013.01)
  *G06F 3/0482* (2013.01)

(52) U.S. Cl.
  CPC ........ *G06F 3/0486* (2013.01); *G06F 3/04817* (2013.01); *G06F 3/04886* (2013.01); *H04N 9/3185* (2013.01); *H04N 9/3194* (2013.01); *H05K 999/99* (2013.01); *G06F 2203/04808* (2013.01)

(56) References Cited

U.S. PATENT DOCUMENTS

| | | | |
|---|---|---|---|
| 9,727,173 B2* | 8/2017 | Mizunuma | G06F 3/0425 |
| 2005/0117132 A1 | 6/2005 | Agostinelli | |
| 2007/0247599 A1 | 10/2007 | Kadowaki et al. | |
| 2008/0010317 A1 | 1/2008 | Tokai | |
| 2008/0018591 A1 | 1/2008 | Pittel et al. | |
| 2009/0295712 A1 | 12/2009 | Ritzau | |
| 2010/0085316 A1* | 4/2010 | Kim | G06F 1/1616 |
| | | | 345/173 |
| 2011/0130159 A1 | 6/2011 | Chen et al. | |
| 2011/0267316 A1 | 11/2011 | Kim et al. | |
| 2012/0062453 A1* | 3/2012 | Oks | G06F 3/017 |
| | | | 345/156 |
| 2012/0139689 A1 | 6/2012 | Nakade et al. | |

\* cited by examiner

FUNCTIONAL CONFIGURATION OF PROJECTION DEVICE AS OUTLINE OF EMBODIMENT

CONFIGURATION OF IMAGE PROJECTION SYSTEM

CONFIGURATION OF PROJECTION DEVICE

CONFIGURATION OF DESK TOP SCREEN

DESK TOP SCREEN PROJECTED WHEN HAND EXISTS ON PROJECTION SURFACE

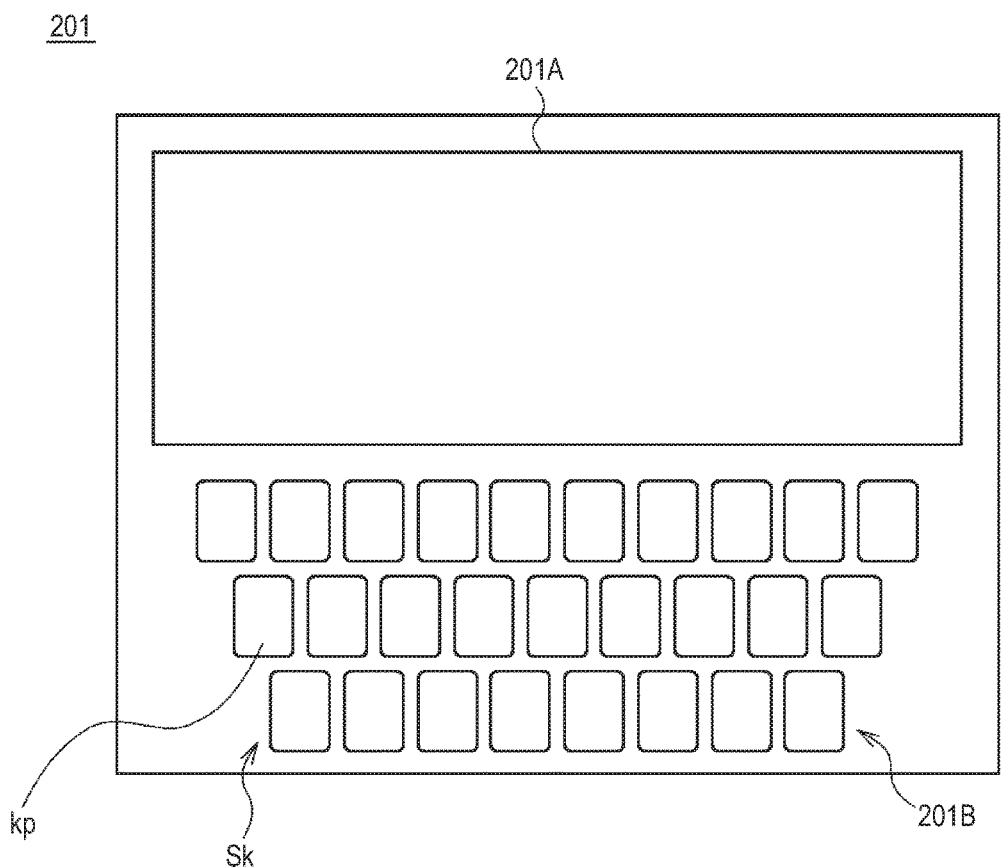

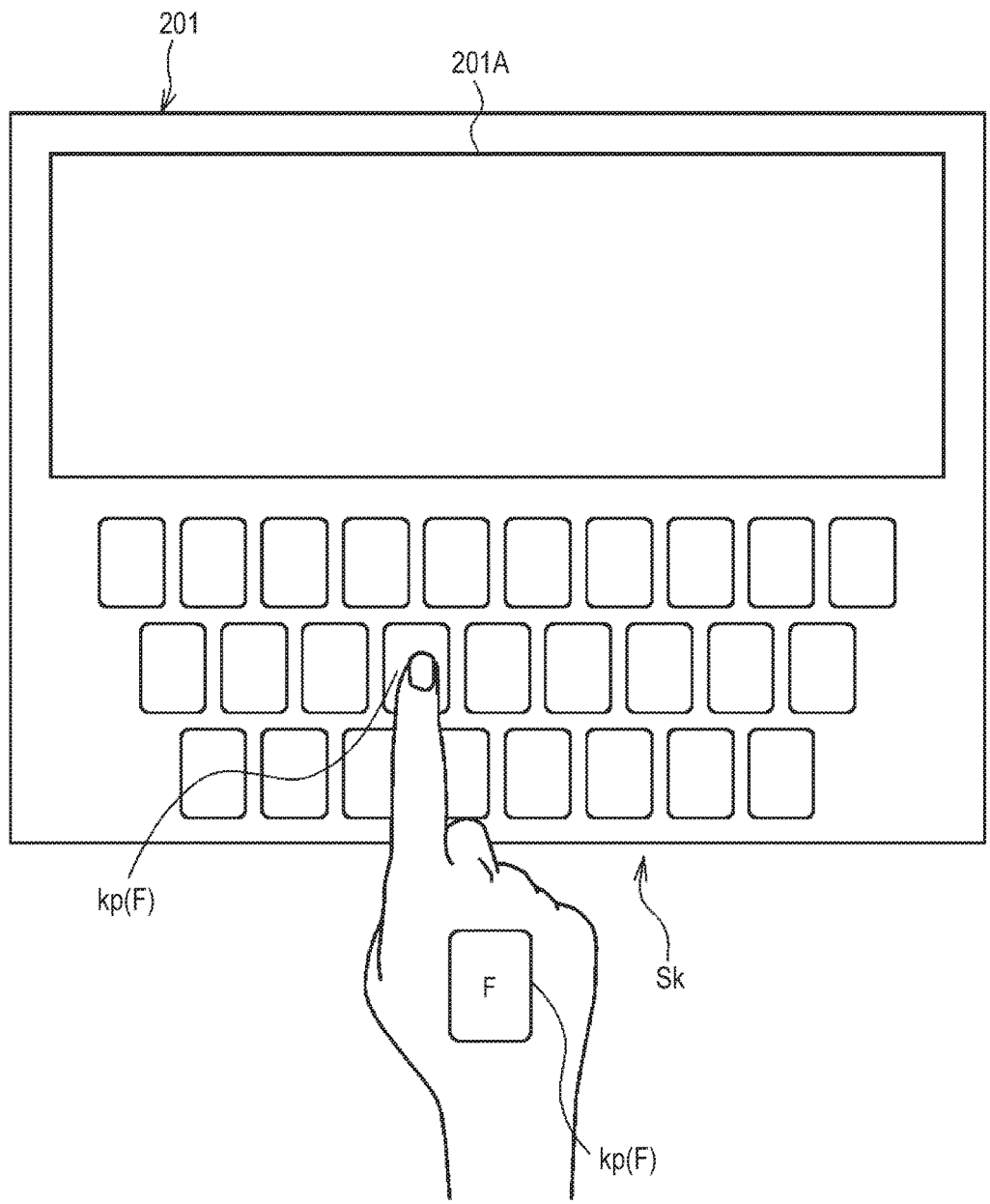

OPERATION INPUT EXAMPLE WITH RESPECT TO WORD PROCESSOR SCREEN (2)

DISPLAY OF CHARACTER

CONFIGURATION OF PAINTING SCREEN

OPERATION INPUT WITH RESPECT TO PAINTING SCREEN (1)

OPERATION INPUT WITH RESPECT TO PAINTING SCREEN (2)

CONFIGURATION OF WEB BROWSER

OPERATION INPUT EXAMPLE WITH RESPECT TO WEB BROWSER SCREEN (1)

OPERATION INPUT EXAMPLE WITH RESPECT TO WEB BROWSER SCREEN (2)

OPERATION INPUT EXAMPLE WITH RESPECT TO WEB BROWSER SCREEN (3)

OPERATION INPUT EXAMPLE WITH RESPECT TO WEB BROWSER SCREEN (4)

OPERATION INPUT EXAMPLE ACCORDING TO SECOND EMBODIMENT (1)

OPERATION INPUT EXAMPLE ACCORDING TO SECOND EMBODIMENT (2)

OPERATION INPUT EXAMPLE ACCORDING TO MODIFICATION EXAMPLE (1)

OPERATION INPUT EXAMPLE ACCORDING TO MODIFICATION EXAMPLE (2)

OPERATION INPUT EXAMPLE ACCORDING TO MODIFICATION EXAMPLE (3)

PROJECTION AND OPERATION INPUT DETECTION DEVICE, METHOD AND PROGRAM

CROSS-REFERENCE TO RELATED APPLICATION

The present application is a continuation of U.S. application Ser. No. 14/940,254, filed Nov. 13, 2015, which is a continuation of U.S. application Ser. No. 13/428,414, filed Mar. 23, 2012 (U.S. Pat. No. 9,223,443), which claims priority from Japanese Patent Application No. JP 2011-075998 filed in the Japanese Patent Office on Mar. 30, 2011, the entire contents of which are hereby incorporated by reference herein.

FIELD

The present disclosure relates to a projection device, a projection method and a projection program suitable for being applied to, for example, a projector projecting images on a projection target member such as a screen or a wall.

BACKGROUND

A projector is widely known in the related art as a projection device projecting images on a projection target member such as a screen or a wall (for example, refer to JP-A-2005-338379 (Patent Document 1)). The projector is used in various fields as it can realize a large screen with a small body though a projection target member is separately necessary.

SUMMARY

For example, assuming a situation where a user put a hand on a projection surface of a screen for pointing an arbitrary place of an image projected on the screen by the projector, a part of the image projected on the screen by the projector is projected on the hand.

At this time, it is difficult to see the image of a part projected on the hand (for example, the image of the part projected on fingers) as the hand has a rough surface. On another front, it is difficult to discriminate the image and the hand as the image is projected on the screen and the hand without a boundary.

As described above, there is a problem in the related-art projector that visibility with respect to an image to be projected and a body is reduced when there exists the body such as a hand between the projector and the projection surface of the screen.

In view of the above, it is desirable to provide a projection device, a projection method and a projection program capable of obtaining good visibility even when there exists a body between a projection unit and a projection target member.

Accordingly, the embodiments of the present disclosure are provided. According to an illustrative embodiment, an information processing apparatus is provided. The apparatus is used for processing a first image projected toward a target. The apparatus includes a processing unit for detecting that an object exists between a projector unit and the target, wherein when an object exists between the projector unit and the target, the apparatus determines an area of the object and generates a modified first image, based on the area of the object, for projection toward the target.

According to the embodiments of the present disclosure, it is possible to prevent the main image from being displayed as it is on the body existing between the projection unit and the projection target member and to project the main image on the projection target member in a state where the main image can be easily discriminated from the body existing between the projection unit and the projection target member. Thus, the projection device, the projection method and the projection program capable of obtaining good visibility even when there exists a body between the projection unit and the projection target member.

BRIEF DESCRIPTION OF THE DRAWINGS

FIG. 6 is a rough diagram showing a configuration of a word processor screen;

FIG. 7 is a rough diagram for explaining an operation input example (1) with respect to the word processor screen;

DETAILED DESCRIPTION

Hereinafter, modes for carrying out the present disclosure (hereinafter, referred to as embodiments) will be explained. The explanation will be made by the following order.

1. Outline of embodiments
2. First Embodiment
3. Second Embodiment
4. Modification Examples <1. Outline of Embodiments>

First, an outline of embodiments will be explained. Incidentally, after the outline is explained, a first embodiment, a second embodiment and a modification example which are specific examples of the embodiments will be made.

Figure 1:
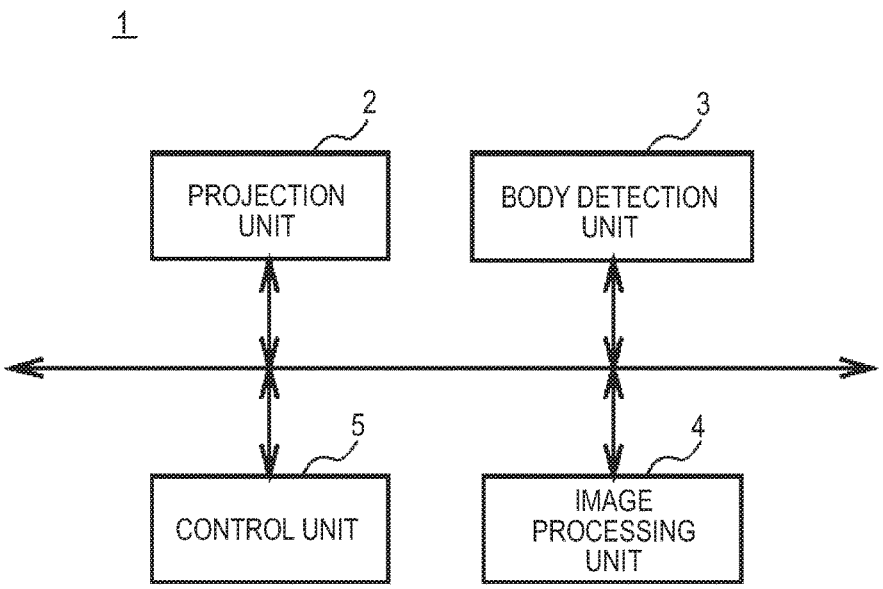
FIG. 1 is a block diagram showing a functional configuration of a projection device as an outline of embodiments.

In FIG. 1, 1 denotes a projection device. The projection device 1 is provided with a projection unit 2 projecting a main image on a projection target member such as a screen. The projection device 1 is also provided with a body detection unit 3 detecting a body existing between the projection unit 2 and the projection target member. The projection device 1 is further provided with an image processing unit 4 performing processing to the main image so that the main image is not projected on the body detected by the body detection unit 3 as it is and a control unit 5 controlling the projection unit 2.

According to the configuration, the projection device 1 prevents the main image from being displayed as it is on a body existing between the projection unit 2 and the projection target member to thereby project the main image on the projection target member in a state where the main image can be easily discriminated from the body existing between the projection unit 2 and the projection target member.

Specifically, the image processing unit 4 performs, for example, processing of cutting a part to be projected on the detected body from the main image so that the main image is not projected on the body detected by the body detection unit 3 as it is. Then, the control unit 5 controls the projection unit 2 to project the main image obtained by cutting the part to be projected on the body on the projection target member.

It is also preferable that the image processing unit 4 performs processing of tinting the part of the main image to be projected on the detected body with a paler color than other parts so that the main image is not projected as it is on the body detected by the body detection unit 3. At this time, the control unit 5 controls the projection unit to project the main image in which the part to be projected on the body is tinted with a paler color than other parts on the projection target member.

The body detection unit 3 detects the body existing between the projection unit 2 and the projection target member, for example, by comparing an image obtained by imaging the projection target member with an image to be projected on the projection target member.

It is further preferable that the body detection unit 3 detects the body existing between the projection unit 2 and the projection target member, for example, by analyzing the image obtained by imaging the projection target member.

It is further preferable that the control unit 5 controls the projection unit 2 to project a sub-image which is different from the main image on the body detected by the body detection unit 3.

It is further preferable that the body detection unit 3 detects a hand of the user as the body existing between the projection unit 2 and the projection target member. The control unit 5 can further control the projection unit to project the sub-image on a back of the hand detected by the body detection unit 3.

It is further preferable that the body detection unit 3 detects a movement of the user's hand existing between the projection unit 2 and the projection target member and that the control unit 5 executes various processing in accordance with the hand movement detected by the body detection unit 3.

Specifically, the control unit 5 controls the projection unit 2 to project, for example, an image of a given screen as the main image on the projection target member. When a hand movement of operating an object arranged on the given screen is detected by the body detection unit 3, the control unit 5 executes processing corresponding to the operation of the object.

It is also preferable that the control unit 5 controls the projection unit to project the image corresponding to the operation of the object on the back of the hand as the sub-image when the hand movement of operating the object arranged on the given screen is detected by the object projection unit 3.

It is further preferable that the control unit 5 executes processing corresponding to the operation of the sub-pixel when a hand movement of operating the sub-image projected on the back of one hand by the other hand is detected by the body detection unit 3.

It is further preferable that the control unit 5 controls the projection unit 2 to project an image of a given screen on the projection target member as a main image and executes processing corresponding to a gesture operation to an object when a hand movement of selecting the object arranged on the given screen is detected by the body detection unit 3 and a hand movement of performing a given gesture operation to one hand selecting the object by the other hand is further detected.

Specific examples of the projection device 1 having the above configuration will be explained in detail below.

<2. First Embodiment>

[2-1. Configuration of an Image Projection System]

Figure 2:
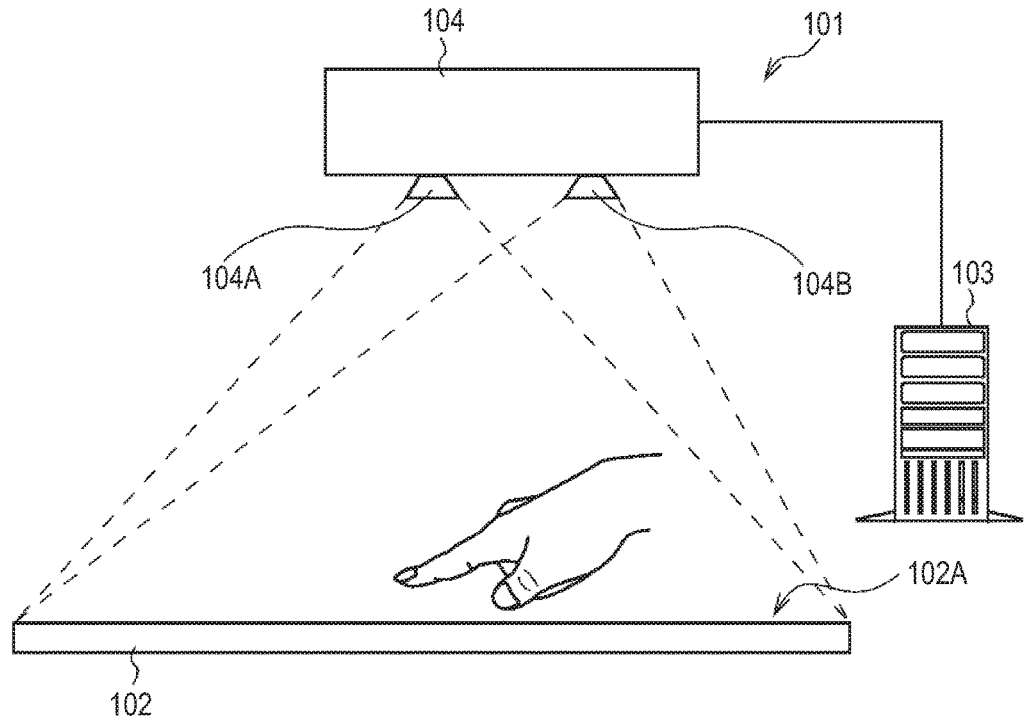
FIG. 2 is a rough diagram showing a configuration of an image projection system.

Next, specific examples of the embodiment will be explained. First, a configuration of an image projection system 100 will be explained with reference to FIG. 2. The image projection system 100 includes a projector device 101 as a specific example of the above projection device 1 and a screen 102 as a specific example of the projection target member.

The projector device 101 of the image projection system 100 includes a main body 103 having a personal computer configuration and a projector unit 104 connected to the main body 103 by a cable and controlled by the body 103.

In the image screen system 100, for example, the flat screen 102 is placed on a desk and the projector unit 104 of the projector device 100 is set above the screen 102 with a projection lens 104A of the projector unit 104 facing downward. The desk and the like can be used as the screen 102.

In the image projection system 100, an image is projected from the projection lens 104A of the projector unit 104 set above the screen 102 on a projection surface 102A of the screen 102 placed downward to thereby display the image on the screen 102.

The projector unit 104 of the projector device 101 is also provided with an imaging lens 104B facing the same direction as the projection lens 104A in the vicinity of the projection lens 104A. The projector device 101 images the projection surface 102A of the screen 102 through the imaging lens 104B.

The projector device 101 takes a difference between an image projected on the projection surface 102A of the screen 102 from the projection lens 104A and an image of the projection surface 102A obtained by imaging the projection surface 102A of the screen 102 through the imaging lens 104B.

When there exists a body which is different from the screen 102 (for example, a finger of the user) on the projection surface 102A of the screen 102, the projector device 101 can detect the body by discriminating the body from the projection surface 102A based on the difference.

When the projector device 101 detects the body in this manner, the projector device 101 further performs image processing to the image to be projected so that a part of the image projected on the screen 102 is not projected on the body as it is. The image processing will be described in detail later.

[2-2. Configuration of the Projector Device]

Next, a configuration of the projector device 101 will be explained in detail with reference to FIG. 3. The projector device 101 includes the main body 103 and the projector unit 104 as described above.

The main body 103 is provided with a CPU 110, a non-volatile memory 111, a RAM 112, an image processing unit 113, an external connection I/F 114 and a network I/F 115. On the other hand, the projector unit 104 includes a projection unit 116 having the projection lens 104A, a liquid crystal panel and a lamp (both are not shown), an imaging unit 117 having the imaging lens 104B and an imaging device (not shown) and an external connection I/F 118.

The external connection I/F 114 of the main body 103 and the external connection I/F 118 of the projector unit 104 are connected through a given cable.

The main body 103 is connected to an external network (for example, Internet) NT through the network I/F 115.

In the projector device 101, the CPU 110 of the main body 103 loads various programs stored in the non-volatile memory 111 to the RAM 112 and executes the programs to control the entire device.

Actually, the CPU 110 controls respective units so as to project an image of a desk-top screen of an OS (Operating System).

Specifically, the image processing unit 113 generates an image signal to be an image of the desk top screen under control of the CPU 110. The image signal is transmitted from the image processing unit 113 to the projection unit 116 of the projector unit 104 through the external connection I/F 114 of the main body 103 and the external connection I/F 118 of the projector unit 104.

The projection unit 116 generates the image based on the image signal (namely, the image of the desk top screen) and projects the image on the screen 102 after enlarging the image by the projection lens 104A.

Figure 4:
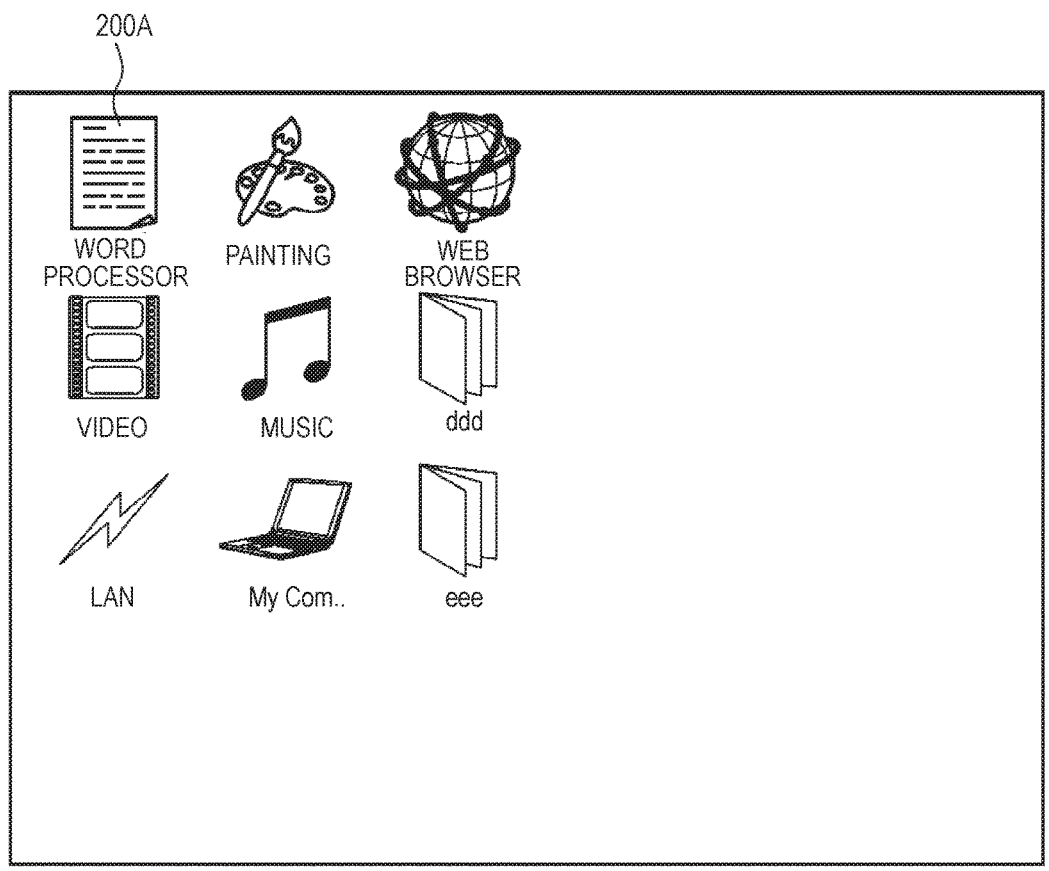
FIG. 4 is a rough diagram showing a configuration of a desk top screen.

As a result, a desk top screen 200 shown in FIG. 4 is displayed on the screen 102.

At this time, the imaging unit 117 of the projector unit 104 images the projection surface 102A of the screen 102 under control of the CPU 110. The imaging unit 117 obtains an image of the projection surface 102 as an imaged result and converts the image into an image signal. The image signal is transmitted from the imaging unit 117 to the video processing unit 113 of the body 103 through the external connection I/F 118 of the projector unit 104 and the external connection I/F 114 of the main body 103.

The image processing unit 113 takes a difference between the transmitted image signal (namely, the image signal obtained by imaging the projection surface 102A) and the image signal projected on the projection surface 102A and transmits the result to the CPU 110.

The CPU 110 determines whether a body different from the screen 102 exists on the projection surface 102A of the screen 102 or not based on the comparison result as well as detects an area of the body existing on the projection surface 102A when it is determined that the body exists.

Actually, assume that the user actually puts a hand on the projection surface 102A of the screen 102. At this time, the CPU 110 can detects an area of the hand based on the difference between the image projected on the projection surface 102A and the image obtained by imaging the projection surface 102A.

The CPU 110 also controls the imaging unit 117 so as to measure a distance from the imaging unit 117 to the hand and a distance from the imaging unit 117 to the projection surface 102A.

Specifically, the imaging unit 117 includes a distance measuring sensor capable of measuring the distance to a subject, and measures the distance to the hand as well as the distance to the projection surface 102A by the distance measuring sensor.

The CPU 110 calculates a distance from the projection surface 102A to the hand by taking a difference between the distance from the imaging unit 117 to the hand and the distance from imaging unit 117 to the projection surface 102A which have been measured by the imaging unit 117.

The CPU 110 can also detect a hand movement on the projection surface 102A three-dimensionally by the detection of the area of the hand and the calculation of the distance from the projection surface 102A to the hand at regular time intervals and can also detect gesture operations such as touching, tapping, dragging, flicking and so on.

It is difficult to measure the distance from the projection surface 102A to the hand with high accuracy, therefore, the CPU 110 determines that the hand touches the projection surface 102A when the distance from the projection surface 102A to the hand is lower than a given value in this case.

Figure 5A:
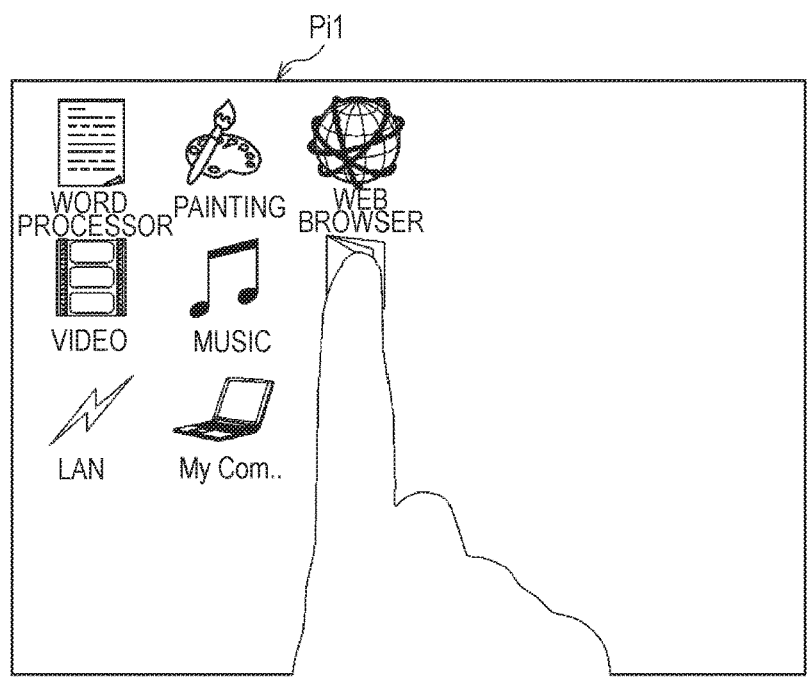
FIGS. 5A and 5B are rough diagrams for explaining projection of the desk top screen when a hand exists on a projection surface.

When the body (the hand in this case) is detected in the above manner, the CPU 110 controls the image processing unit 113 to generate an image Pi1 obtained by cutting a part projected on the hand from the image of the projected desk top screen 200 as shown in FIG. 5A.

Specifically, the image processing unit 113 extracts a contour of a hand and cuts an image of a part inside the contour of the hand from the image of the projected desk top screen 200.

Then, the CPU 110 projects the image generated in this manner (namely, the image of the desk top screen 200 obtained by cutting the part displayed on the hand) Pi1 on the screen 102 by the projection unit 116.

Figure 5B:
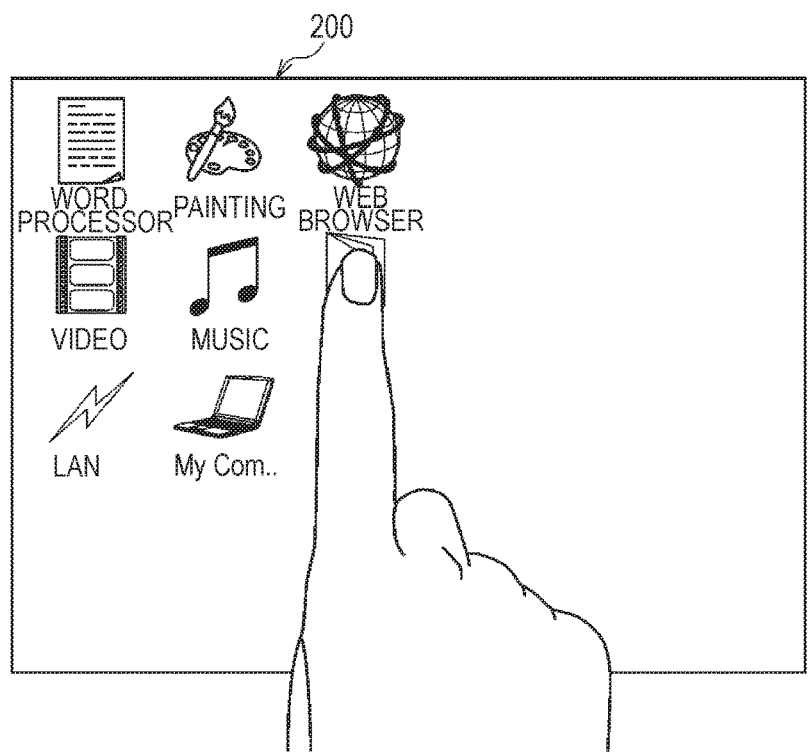

Then, the image of the desk top screen 200 is displayed on the projection surface 102A of the screen 102 in a state where nothing is displayed on the hand as shown in FIG. 5B.

As described above, the projector device 101 is configured not to project the image of the desk top screen 200 on the hand when there exists the hand on the projection screen 102A.

Thus, the projector device 101 can prevent difficulty in seeing a part of the image of the desk top screen 200 projected on the hand having the rough surface as well as can project the image of the desk top screen 200 in a state where the image can be discriminated from the hand easily.

According to the above, the projector device 101 can give the user a feeling as if the hand is put on the desk top screen 200.

Moreover, the projector device 101 can perform various operation inputs with respect to the desk top screen 200 with a feeling as if the user touches the projected desk top screen 200.

Here, plural icons 200A corresponding to various applications are arranged on the desk top screen 200 as shown in FIG. 4.

Assume that the user performs a gesture operation of touching a desired icon 200A with a finger twice on the projection surface 102A in a state where the desk top screen 200 is projected. At this time, the CPU 110 recognizes that the gesture has been performed from the detected movement of the hand.

Then, the CPU 110 receives the gesture operation as an operation of activating an application corresponding to the icon 200A and activates the application by reading out programs of the application from the non-volatile memory 111 and executing the programs.

Here, the image processing unit 113 generates an image signal to be an image of an application screen under control by the CPU 110. The image signal is transmitted from the image processing unit 113 to the projection unit 116 of the projector unit 104 through the external connection I/F 114 of the main body 103 and the external connection I/F 118 of the projector unit 104.

The projection unit 116 generates the image based on the image signal (namely, the image of the application screen) and projects the image on the screen 102 after enlarging the image by the projection lens 104A.

As a result, the application screen is displayed on the screen 102.

In the projector device 101, various operation inputs can be performed also with respect to the application screen with the feeling as if directly touching the screen in the same manner as the desk top screen 200.

The operation input with respect to the application screens will be explained below by each application.

In this case, assume that a word processing software package, a painting software package and a Web browser are installed in the projector device 101 as applications.

Incidentally, the projection unit 2 of the projection device 1 explained in the outline of the embodiments corresponds to the projection unit 116 of the above projector device 101. The body detection unit 3 of the projection device 1 corresponds to the CPU 110 and the imaging unit 117 of the projector device 101. The image processing unit 4 of the projection device 1 corresponds to the image processing unit 113 of the projector device 101. Furthermore, the control unit 5 of the projection device 1 corresponds to the CPU 110 of the projector device 101.

[2-3. Operation Inputs with Respect to Application Screens]
[2-3-1. Operation Input in a Word Processor Screen]

First, an operation input with respect to an application screen of the word processing software (also referred to as a word processor screen) will be explained.

When the word processing software is activated, the projector device 101 projects an image of a word processor screen 201 as shown in FIG. 6 on the projection surface 102A of the screen 102.

The word processor screen 201 includes a text display area 201A in which inputted characters are displayed and a keyboard display area 201B in which a software keyboard Sk having plural key pictures kp is displayed.

Also in the case of projecting such word processor screen 201, the projector device 101 is configured not to project the image of the word processor screen 201 on the hand existing on the projection screen 102A.

Thus, the projector device 101 can give the user a feeling as if the user puts the hand on the word processor screen 201 when putting the hand on the projection surface 102A.

In the word processor screen 201, character input is performed by using the software keyboard Sk displayed on the keyboard display area 201B.

Actually, assume that the user performs a gesture operation of touching a key picture kp (F) corresponding to a character "F" with a tip of an index finger of the right hand for inputting the character "F" on the projection surface 102A as shown in FIG. 7. Also in this case, the word processor screen 201 is not displayed on the hand. Therefore, the user sees the screen as if a part of the key picture kp (F) is concealed by the touched fingertip.

At this time, the CPU 110 of the projector device 101 specifies a position of the tip of the index finger of the right hand from the shape of the detected area of the hand. Then, the CPU 110 recognizes that the key picture kp (F) has been touched by the index finger of the right hand based on the position and arrangement of respective key pictures kp.

Here, the CPU 110 controls the image processing unit 113 and the projection unit 116 to display the key picture kp (F) touched by the index finger on the back of the hand which is a relatively flat part on the surface of the hand existing on the projection surface 102A.

Specifically, the image processing unit 113 generates a composite image by combining the key picture kp (F) with an image of the word processor screen 201 obtained by cutting a part inside the contour of the hand so that the key picture kp (F) is positioned at the part to be the back of the hand inside the contour of the hand. The composite image is projected on the screen 102 by the projection unit 116.

The image processing unit 113 estimates the part to be the back of the hand which is inside the area of the hand based on the shape of the area of the hand (namely, the contour of the hand).

As a result, the image of the word processor screen 201 is displayed outside the hand existing on the projection surface 102A as well as the key picture kp (F) is displayed on the back of the hand existing on the projection screen 102A.

Thus, the projector device 101 can give the user a feeling as if directly touching the key picture kp as well as allow the user to recognize which key picture kp is touched at present (namely, which key picture kp is concealed by the fingertip) easily.

Then, the projector device 101 fixes the character to be inputted when the key picture kp (F) displayed on the part of the back of one hand is touched by a fingertip of the other hand.

Figure 8:
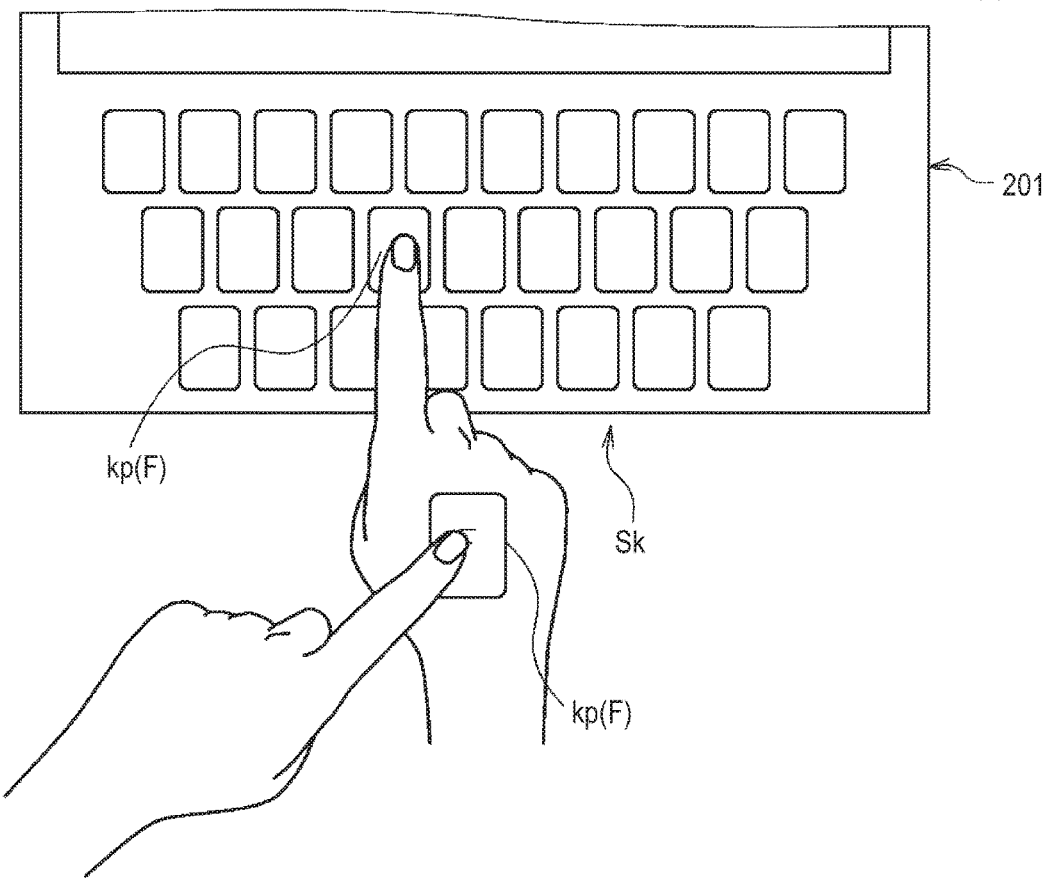
FIG. 8 is a rough diagram for explaining an operation input example (2) with respect to the word processor screen.

Actually, assume that the user touches the key picture kp (F) displayed on the back of the right hand with a tip of an index finger of the left hand while touching the key picture kp (F) of the software keyboard Sk by the right hand as shown in FIG. 8.

At this time, the CPU 110 of the projector device 101 specifies a position of the back of the right hand and a position of the tip of the index finger of the left hand from the shape of the area of the hand. Then, the CPU 110 recognizes that the key picture kp (F) displayed on the back of the right hand has been touched by the left hand based on these positions.

Here, the CPU 110 fixes the character to be inputted to the character "F" corresponding to the key picture kp (F) as well as controls the image processing unit 113 and the projection unit 116 to display the character "F" inside the text display area 201A in the word processor screen 201.

Figure 9:
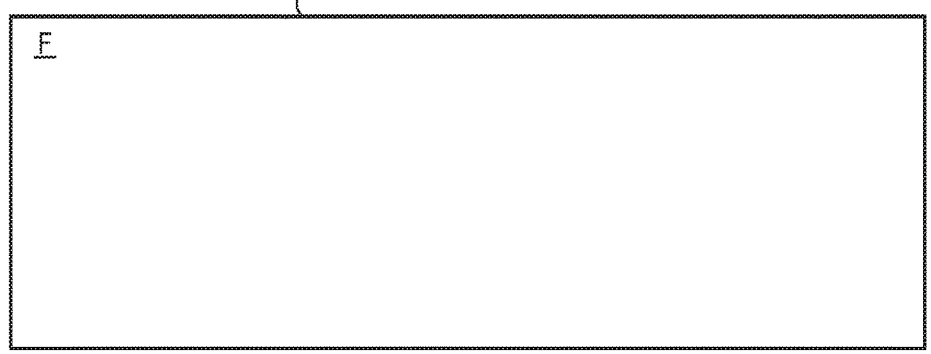
FIG. 9 is a rough diagram for explaining control in display of a character.

As a result, the character "F" is displayed inside the text display area 201A in the word processor screen 201 projected on the projection screen 102A as shown in FIG. 9.

Thus, the projector device 101 can input characters with an operational feeling like a touch panel as well as without fail.

As explained above, the projector device 101 can positively input characters with operational feeling as if directly touching the software keyboard Sk of the word processor screen 201 projected on the screen 102 at the time of activating the word processing software.

[2-3-2. Operation Input in a Painting Screen]

Next, an operation input with respect to an application screen of the painting software (also referred to as a painting screen) will be explained.

Figure 10:
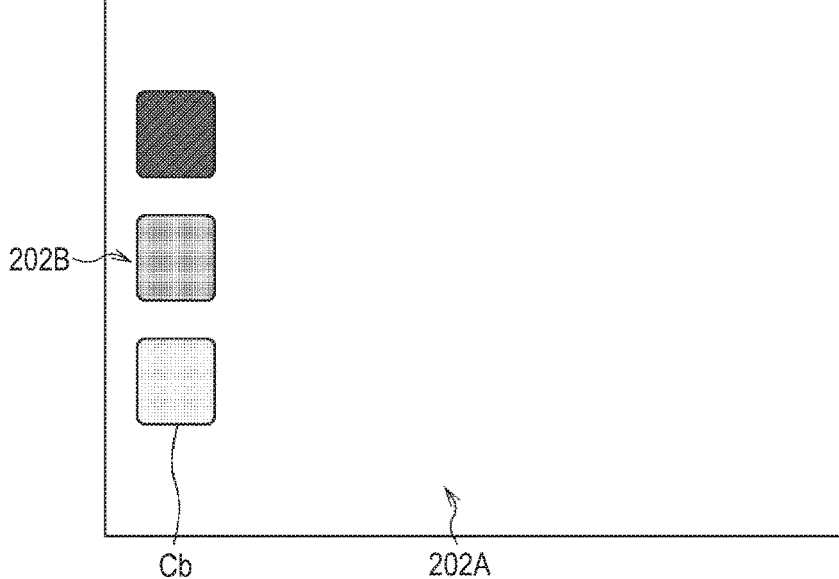
FIG. 10 is a rough diagram showing a configuration of a painting screen.

The projector device 101 projects an image of a painting screen 202 as shown in FIG. 10 on the projection surface 102A of the screen 102 when activating the painting software.

The painting screen 202 includes a canvas area 202A in which lines can be drawn freely and a color palette 202B for designating colors of lines. The color palette 202B includes plural color boxes Cb corresponding to respective colors.

Also in the case of projecting the painting screen 202, the projector device 101 is configured not to project the image of the painting screen 202 on the hand put on the projection surface 102A.

In the painting screen 202, after selecting the color of the line from the color palette 202B, the line is drawn by performing dragging inside the canvas area 202A.

Figure 11:
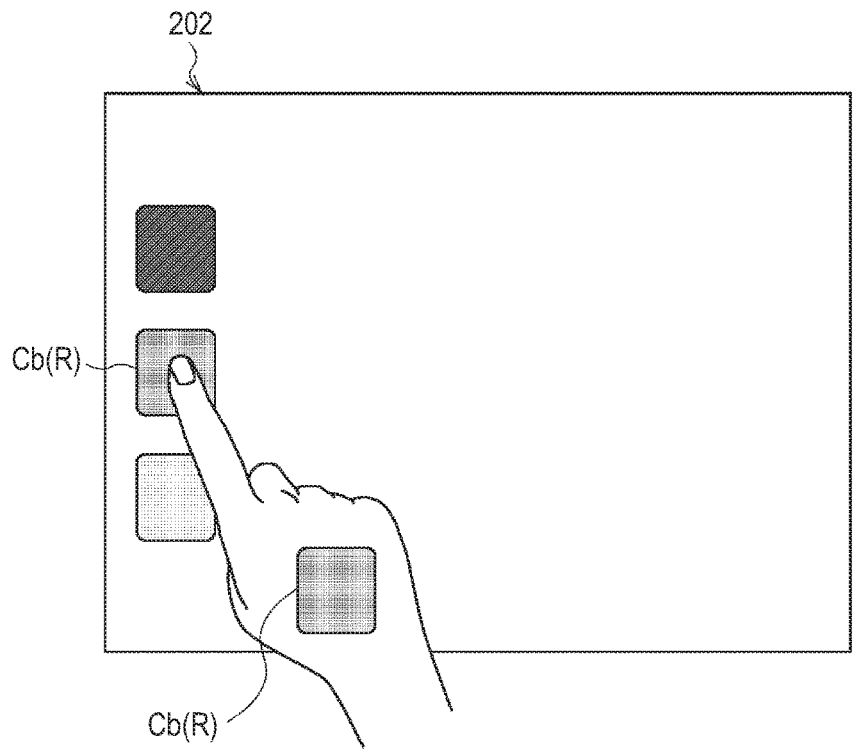
FIG. 11 is a rough diagram for explaining an operation input example (1) with respect to the painting screen.

Actually, assume that the user performs a gesture operation of touching a color box Cb (R) corresponding to red in the color palette 202B with a tip of the index finger of the right hand on the projection surface 102A for selecting, for example, red as shown in FIG. 11.

At this time, the CPU 110 of the projector device 101 specifies the position of the tip of the index finger of the right hand from the shape of the detected area of the hand. Then, the CPU 110 recognizes that the color box Cb (R) has been touched by the index finger of the right hand based on the position and arrangement of respective color boxes Cb.

Here, the CPU 110 determines the color of the line to red as well as controls the image processing unit 113 and the projection unit 116 to display the color box Cb (R) touched by the index finger on the back of the hand existing on the projection surface 102A.

Specifically, the image processing unit 113 generates a composite image by combining the color box Cb (R) with the image of the painting screen 202 obtained by cutting a part inside the contour of the hand so that the color box Cb (R) is positioned at the part of the back of the hand inside the contour of the hand. Then, the composite image is projected on the screen 102 by the projection unit 116.

As a result, the image of the painting screen 202 is displayed outside the hand existing on the projection surface 102A as well as the color box Cb (R) is displayed on the back of the hand existing on the projection surface 102A.

Thus, the projector device 101 can give the user a feeling as if directly touching the color box Cb as well as allow the user to recognize which color is selected at present easily.

The CPU 110 detects the area of the hand existing on the projection surface 102A continuously to thereby continue displaying the color box Cb (R) on the back of the hand, for example, when the hand moves on the projection surface 102A.

Additionally, the color to be selected can be changed by touching the color box Cb of another color again in the painting screen 202.

Figure 12:
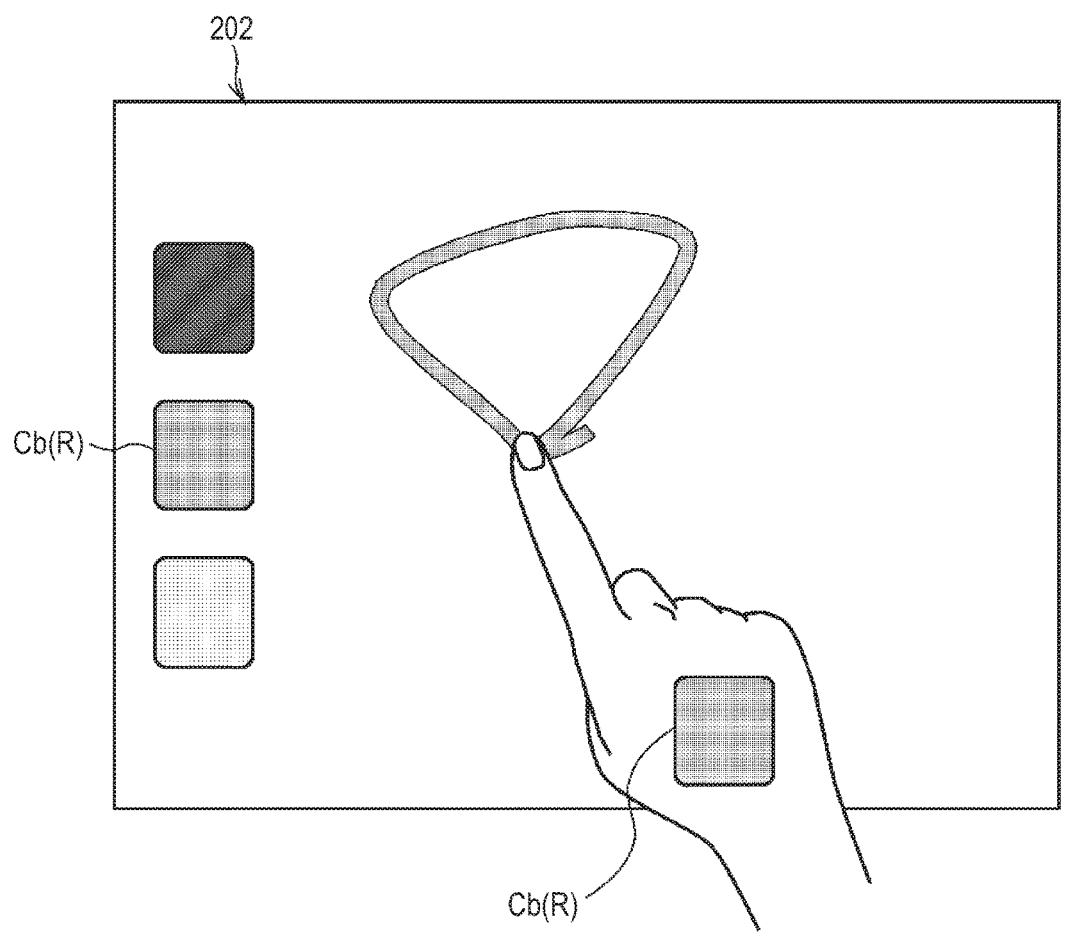
FIG. 12 is a rough diagram for explaining an operation input example (2) with respect to the painting screen.

After that, assume that the user performs a gesture operation of performing dragging in the canvas area 202A by the tip of the index finger of the right hand on which the color box Cb (R) is displayed on the projection surface 102A as shown in FIG. 12.

At this time, the CPU 110 of the projector device 101 specifies a position of the tip of the index finger of the right hand from the shape of the detected area of the hand. Then, the CPU 110 recognizes that the dragging is performed in the canvas area 202A by the tip of the index finger of the right hand based on the position.

Here, the CPU 110 controls the image processing unit 113 and the projection unit 116 to draw a line with a color selected at present along a dragging trail in the canvas area 202A.

As a result, the line is drawn with the color selected at present along the dragging trail in the canvas area 202A of the painting screen 202 projected on the projection surface 102A.

As explained above, the projector device 101 can paint a picture with an operation feeling as if directly performing dragging in the canvas area 202A of the painting screen 202 projected on the screen 102 at the time of activating the painting software.

[2-3-3. Operation Input in a Web Browser Screen]

Next, an operation input with respect to an application screen of a Web browser (also referred to as a Web browser screen) will be explained.

Figure 13:
FIG. 13 is a rough diagram showing a configuration of a Web browser screen.

The projector device 101 projects an image of a Web browser screen 203 as shown in FIG. 13 on the projection surface 102A of the screen 102 when activating the Web browser.

The Web browser screen 203 includes a tool bar 203A in which various menus, buttons, an address input field, a search word input field and so on are arranged and a page display area 203B in which page images of Web pages are displayed.

Also in the case of projecting the Web browser screen 203, the projector device 101 is configured not to project the image of the Web browser screen 203 on the hand put on the projection surface 102A.

In the Web browser, processing corresponding to each of various menus and buttons is executed by touching various menus and buttons in the tool bar 203A.

Actually, assume that the user performs a gesture operation of, for example, touching a homepage button in the tool bar 203A by the tip of the index finger of the right hand on the projection surface 102A for browsing Web pages set in the home page.

At this time, the CPU 110 of the projector device 101 recognizes that the home page button has been touched by the tip of the index finger of the right hand based on the detected area and the movement of the hand.

Here, the CPU 110 makes an access to addresses of Web pages set in the homepage through the network I/F 115 to receive page data of the Web pages.

Then, the CPU 110 controls the image processing unit 113 and the projection unit 116 to display page images based on the page data in the page display area 203B of the Web browser screen 203.

As a result, page images of the home page are displayed in the page display area 203B of the Web browser screen 203.

Figure 14:
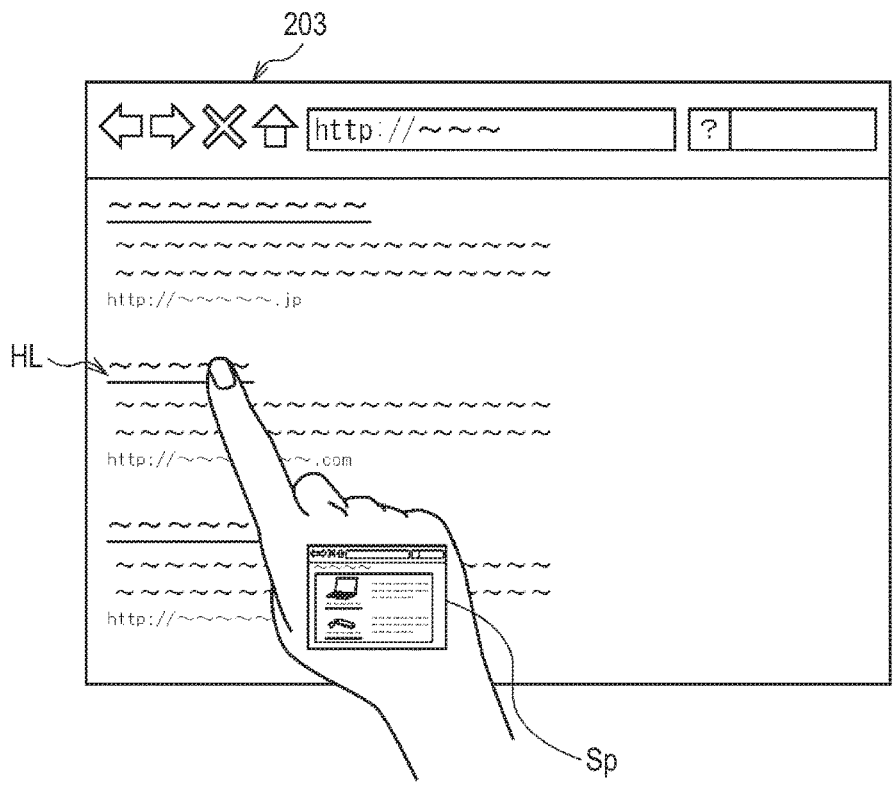
FIG. 14 is a rough diagram for explaining an operation input example (1) with respect to the Web browser screen.

Here, assume that the user performs a gesture operation of touching a hyper link HL in the page images displayed in the page display area 203B by the tip of the index finger of the right hand on the projection surface 102A as shown in FIG. 14.

At this time, the CPU 110 of the projector device 101 recognizes that the hyper link HL in the page images has been touched by the tip of the index finger of the right hand based on the detected area and movement of the hand.

Then, the CPU 110 makes an access to a link destination shown by the hyper link HL through the network I/F 115 and receives page data from the link destination.

Then, the CPU 110 controls the image processing unit 113 and the projection unit 116 to reduce the size of a page image based on the page data (also referred to as a link-destination page image) so as to be within the size of the back of the hand and to project the page image on the back of the hand touching the hyper link HL.

As a result, a link-destination page image which has been reduced (referred to as a reduced link-destination page image) Sp is displayed on the back of the hand touching the hyper link HL.

Thus, the projector device 101 allows the user to check what page is the link-destination Web page before switching the display contents of the page display area 203B to the link-destination page image.

Then, the projector device 101 is configured to switch the display contents of the page display area 203B to the link-destination page image when the reduced link-destination page image Sp displayed on the back of one hand is touched by a fingertip of the other hand.

Specifically, assume that the user puts the tip of the index finger of the left hand on the back of the right hand so that the reduced link-destination page image Sp displayed on the back of the right hand is touched by the tip of the index finger of the left hand while touching the hyper link HL by the right hand.

At this time, the CPU 110 of the projector device 101 recognizes that the reduced link-destination page image Sp displayed on the back of the right hand has been touched by the left hand based on the detected area and movement of the hand.

Then, the CPU 110 controls the image processing unit 113 and the projection unit 116 to display the link-destination page image in the page display area 203B. As a result, the link-destination page image is displayed in the page display area 203B.

As described above, in the Web browser screen 203, it is possible to display the Web page in the page display area 203B after the user is allowed to check what page is the link destination Web page.

Thus, the projector device 101 can allow the user to browse the desired Web page more positively.

Moreover, in the Web browser screen 203, a desired part of text can be copied by performing dragging on the text in the page image displayed on the page display area 203B.

Figure 15:
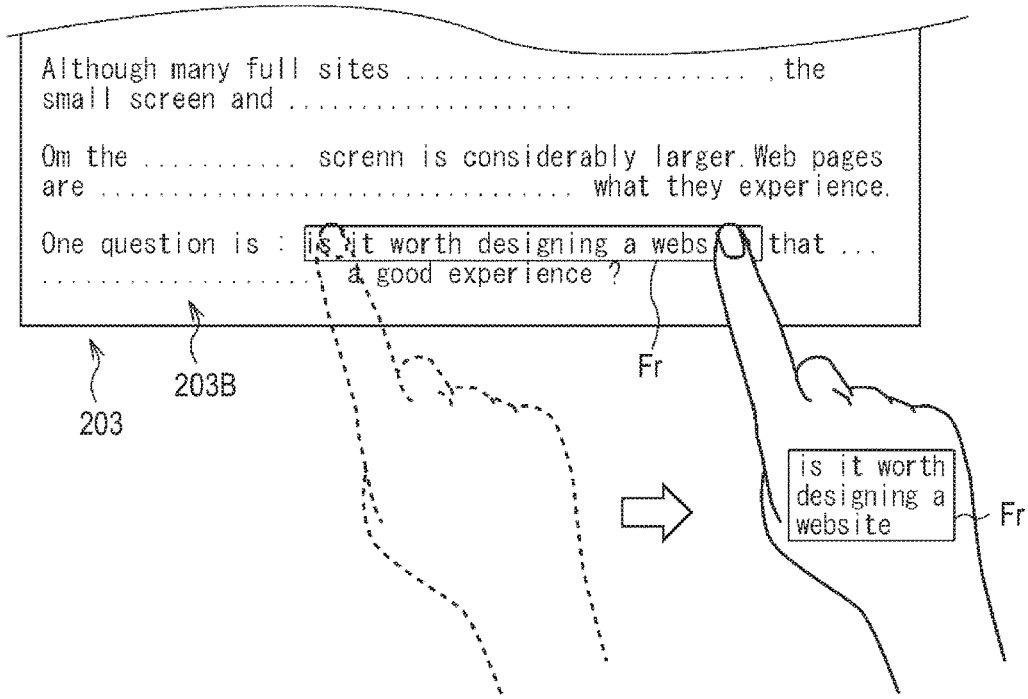
FIG. 15 is a rough diagram for explaining an operation input example (2) with respect to the Web browser screen.

Actually, assume that the user performs a gesture operation of performing dragging on a desired part of text in the page image by the tip of the index finger of the right hand on the projection surface 102A as shown in FIG. 15.

At this time, the CPU 110 of the projector device 101 recognizes that the desired part of text has been dragged by the tip of the index finger of the right hand based on the detected area and movement of the hand.

Then, the CPU 110 controls the image processing unit 113 and the projection unit 116 to display a frame Fr indicating a copy range surrounding the dragged desired part on the page image. As a result, the frame Fr is displayed on the page image.

Also at this time, the CPU 110 controls the image processing unit 113 and the projection unit 116 to project text of the part surrounded by the frame Fr on the back of the right hand performing dragging. As a result, the text of the part surrounded by the frame Fr is displayed on the back of the right hand.

Thus, the projector device 101 can allow the user to easily recognize which part of the test is the copy range at present by the dragging while giving the user a feeling as if directly performing dragging on the text.

After that, it is determined that the dragging has been completed by releasing the fingertip which performing dragging from the projection surface 102A by the user.

At this time, the CPU 110 recognizes that the dragging has been completed based on the detected hand movement.

Then, the CPU 110 determines the part displayed on the back of the hand at this time (namely, the part surrounded by the frame Fr) as a part to be copied and copies the test at this part on a clip board. The desired part of text is copied in this manner.

Here, the CPU 110 controls the image processing unit 113 and the projection unit 116 to continue displaying the desired part on the back of the right until a later-described paste operation is performed even after the desired part of text has been copied on the clip board.

Thus, the projector device 101 can allow the user to recognize what information is copied on the clip board at present easily.

On the other hand, in the Web browser screen 203, a desired picture in the page images displayed in the page display area 203B is touched for a given period of time to thereby copy the picture.

Figure 16:
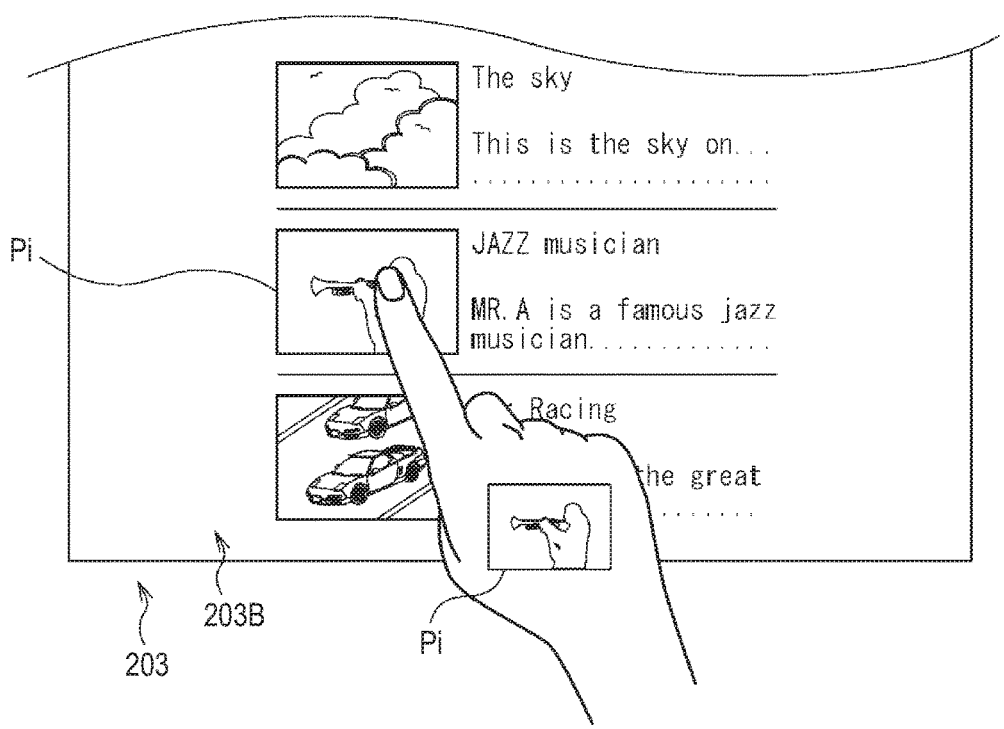
FIG. 16 is a rough diagram for explaining an operation input example (3) with respect to the Web browser screen.

Actually, assume that the user performs a gesture operation of continuing touching a desired picture Pi in the page images for a given period of time by the tip of the index finger of the right hand on the projection surface 102A as shown in FIG. 16.

At this time, the CPU 110 of the projector device 101 recognizes that the picture Pi has been touched for a given period of time by the tip of the index finger of the right hand based on the detected area and movement of the hand.

Then, the CPU 110 controls the image processing 113 and the projection unit 116 to project the picture Pi on the back of the right hand touching the picture Pi. As a result, the picture Pi is displayed on the back of the right hand touching the picture Pi.

The CPU 110 also copies the picture Pi on the clip board. The desired picture Pi is copied in this manner.

Here, the CPU 110 controls the image processing unit 113 and the projection unit 116 to continue displaying the picture Pi on the back of the right hand until the later-described paste operation is performed even after the desired picture Pi is copied on the clip board.

Thus, the projector device 101 can copy the picture with a feeling as if directly touching the image and can further allow the user to recognize the picture copied on the clip board at present easily.

Additionally, in the Web browser screen 203, information displayed on the back of one hand (namely, text or the picture copied on the clip board) is dragged to a fingertip of one hand by the other hand, thereby pasting the information to a position pointed by the fingertip of one hand.

Figure 17:
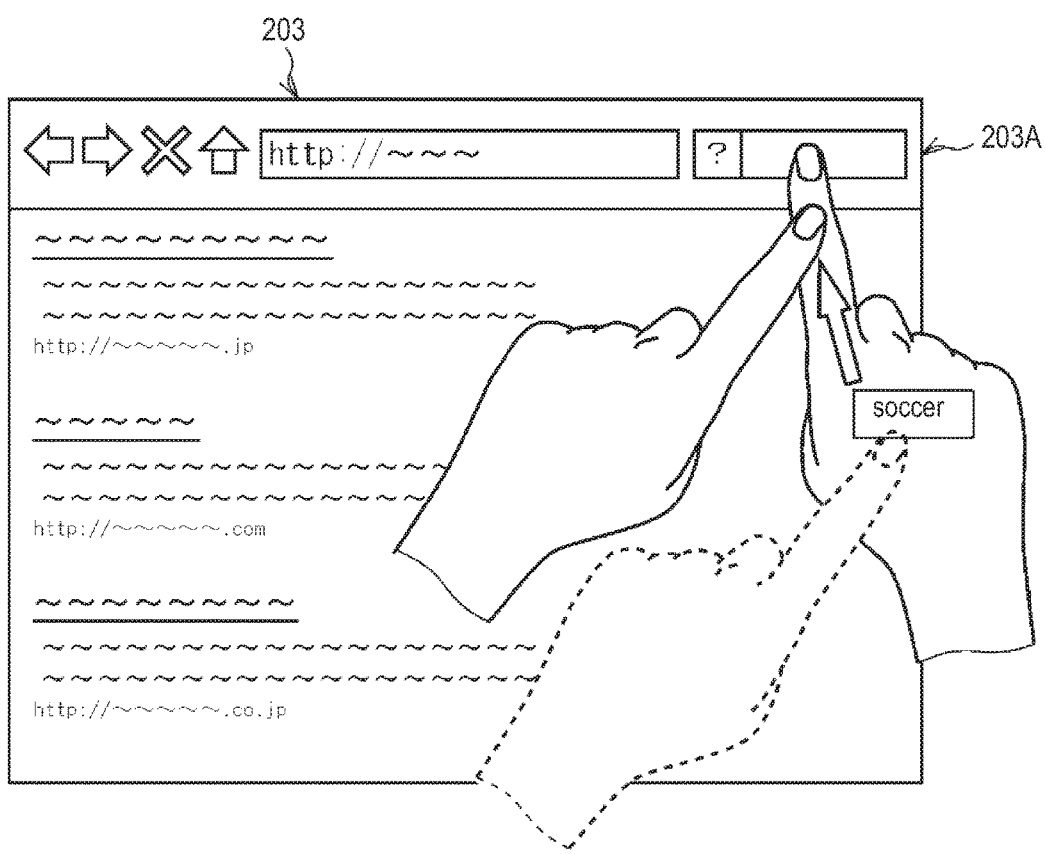
FIG. 17 is a rough diagram for explaining an operation input example (4) with respect to the Web browser screen.

Actually, assume that the user points at the search keyword input field in the tool bar 203A by the tip of the index finger of the right hand in a state where text is displayed on the back of the right hand as shown in FIG. 17. Moreover, assume that the user drags the text displayed on the back of the right hand to the tip of the index finger of the right hand by the tip of the index finger of the left hand.

At this time, the CPU 110 of the projector device 101 recognizes that the text displayed on the back of the right hand has been dragged to the tip of the index finger of the right hand by the tip of the index finger of the left hand based on the detected area and movement of the hand.

Then, the CPU 110 controls the image processing unit 113 and the projection unit 116 to display the text displayed on the back of the right hand (namely, the text copied on the clip board) in the search keyword input field pointed by the tip of the index finger of the right hand. As a result, the text copied on the clip board is displayed on the search keyword input field. Thus, the information copied on the clip board is pasted.

The projector device 101 can paste information copied on the clip board at a desired position by intuitive operation in the manner described above.

[2-4. Processing Routine]

Next, an outline of a routine of processing executed by the projector device 101 (also referred to as a projection processing routine) when projecting the image on the projection surface 102A of the screen 102 will be explained by using a flowchart shown in FIG. 18.

Figure 18:
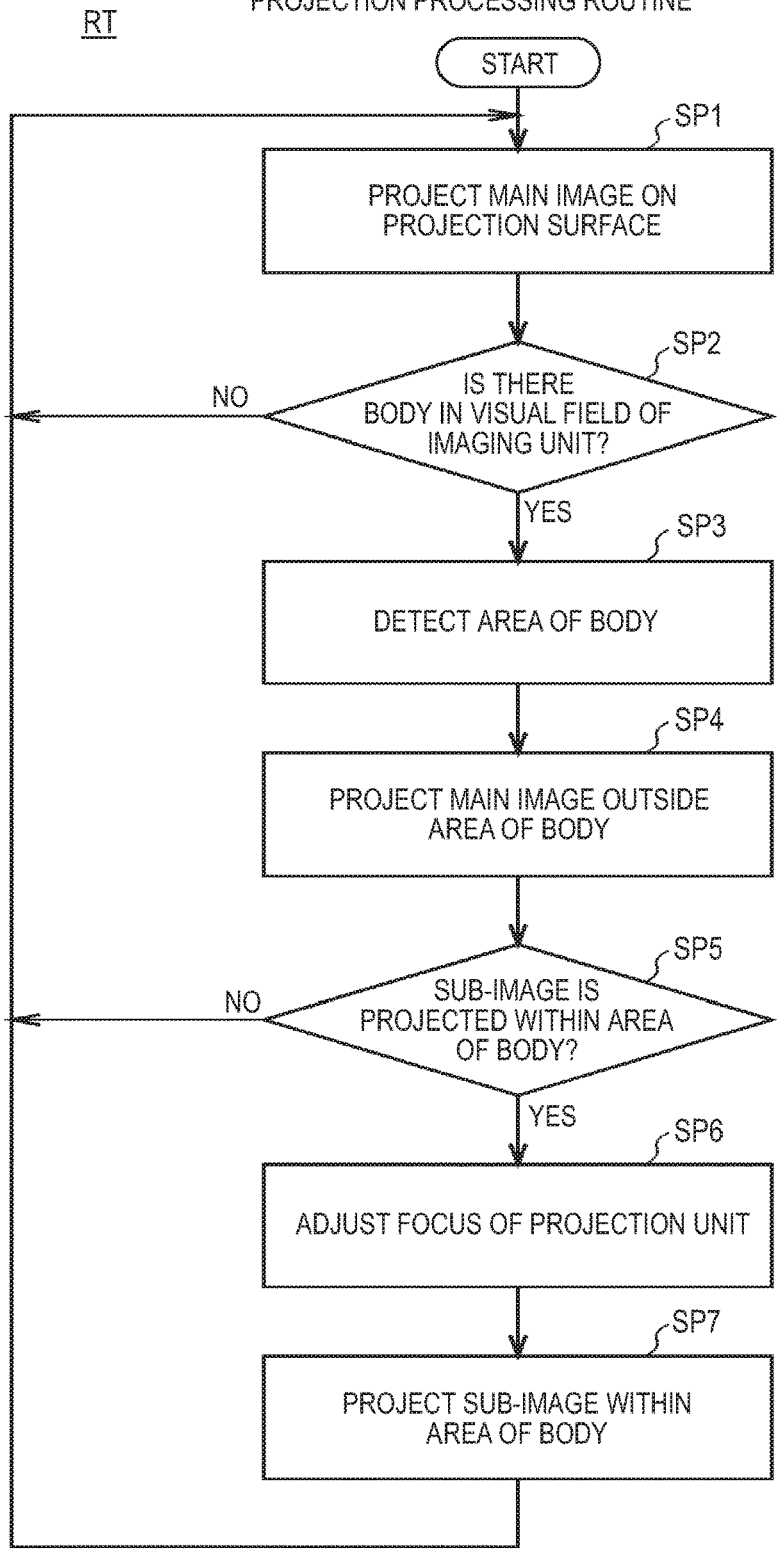
FIG. 18 is a flowchart showing a projection processing routine.

A projection processing routine RT shown in FIG. 18 is a routine of processing executed by the CPU 110 of the projector device 101 in accordance with programs stored in the non-volatile memory 111.

The CPU 110 starts the projection processing routine RT and proceeds to Step SP1, for example, when the power of the projector device 101 is turned on. In Step SP1, the CPU 110 controls the image processing unit 113 and the projection unit 116 to project an image of various types of screens to be displayed on the projection surface 102A (also referred to as a main image) on the projection surface 102A of the screen 102, and proceeds to the next Step SP2.

The CPU 110 compares the main image projected on the projection surface 102A from the projection unit 116 with the image obtained by imaging the projection surface 102A by the imaging unit 117 in Step SP2, thereby determining whether a body such as a hand exists in a visual field of the imaging unit 117 (namely, on the projection surface 102A).

When a negative result is obtained in Step SP2, this means that there exists nothing on the projection surface 102A. At this time, The CPU 110 continues projecting the main image as it is on the projection surface 102A and returns to Step SP1.

On the other hand, when an affirmative result is obtained in Step SP2, this means that a body such as a hand exists on the projection surface 102A. At this time, the CPU 110 proceeds to Step SP3.

The CPU 110 detects an area of the body in Step SP3 and proceeds to Step SP4. The CPU 110 projects the main image obtained by cutting a part within the detected area of the body on the projection surface 102 so that the main image is displayed outside the detected area of the body and proceeds to the next Step SP5.

In Step SP5, the CPU 110 determines whether an image different from the main image (also referred to as a bus-image) is projected within the detected area of the body.

When a negative result is obtained in Step SP5, the CPU 110 returns to Step SP1 again.

On the other hand, when an affirmative result is obtained in Step SP5, this means that the CPU 110 determines that the key picture kp is projected on the back of the hand, for example, as the key picture kp included in the software keyboard Sk is touched by the hand. At this time, the CPU 110 proceeds to Step SP6.

In Step SP6, the CPU 110 obtains the distance from the projector unit 104 to the body and the distance from the projector unit 104 to the projection surface 102 from the imaging unit 107 and controls the projection unit 116 so as to be focused on a position between the hand and the projection surface 102A based on these distances.

Thus, the projector device 101 can project the image with high image quality to both of the body and the projection surface 102A which have different distances from the projector unit 104.

After that, the CPU 110 proceeds to the next Step SP7 and projects the image obtained by combining the main image with the sub-image on the projection surface 102A so that the sub-image is displayed on a flat part (for example, the back of the hand) within the area of the detected body, then, returns to Step SP1 again.

The projector device 101 projects images on the projection surface 102A of the screen 102 in accordance with the projection processing routine RT.

[2-5. Operations and Effects of the First Embodiment]

In the above configuration, the projector device 101 determines whether the user's hand exists on the projection surface 102A or not by comparing the image (main image) such as the desk top screen 200 projected on the projection surface 102A of the screen 102 with the image obtained by imaging the projection surface 102A of the screen 102.

Here, when it is determined that the user's hand exists, the projector device 101 projects the main image obtained by cutting the part projected within the area of the hand on the projection surface 102A so that the main image is not projected on the hand.

As a result, the main image is displayed on the projection surface 102A of the screen 102 except the area of the hand.

Thus, the projector device 101 can prevent difficulty in seeing a part of the main image to be projected within the area of the hand having the rough surface as well as can project the main image on the screen 102 in a state where the image can be discriminated from the hand easily.

Moreover, the projector device 101 projects the image (sub-image) different from the main image on the back of the hand which is a relatively flat part within the area of the hand existing on the projection surface 102A if necessary.

As described above, the projector device 101 allows the user to see the main image and the sub-image at the same time as well as in a state of being clearly separated by using the part of the back of the hand as a display area different from the projection surface 102A of the screen 102.

According to the above configuration, the projector device 101 prevents the main image from being displayed on the hand existing on the projection surface 102A and can project the main image on the projection surface 102A so that the image can be discriminated from the hand existing on the projection surface 102A easily. Thus, the projector device 101 can obtain good visibility even when there exists the hand on the projection surface 102A.

<3. Second Embodiment>

Next, a second embodiment will be explained. In the second embodiment, when an icon 200A arranged on the desk top screen 200 is touched, a context menu of the icon 200A is displayed on the back of the hand touching the icon 200A.

The context menu is also called an option menu, a shortcut menu and so on, in which names of processing executable with respect to the icon are displayed in a list such as "copy", "delete", "activation of applications" and so on and desired processing can be selected and executed.

As the configuration of an image projection system according to the second embodiment is the same as the first embodiment, refer to the first embodiment. Therefore, only the operation input with respect to the desk top screen 200 will be explained here.

First, assume that the desk top screen 200 on which plural icons 200A corresponding to various applications are arranged is projected on the projection surface 102A of the screen 102 in the same manner as the first embodiment.

Figure 19:
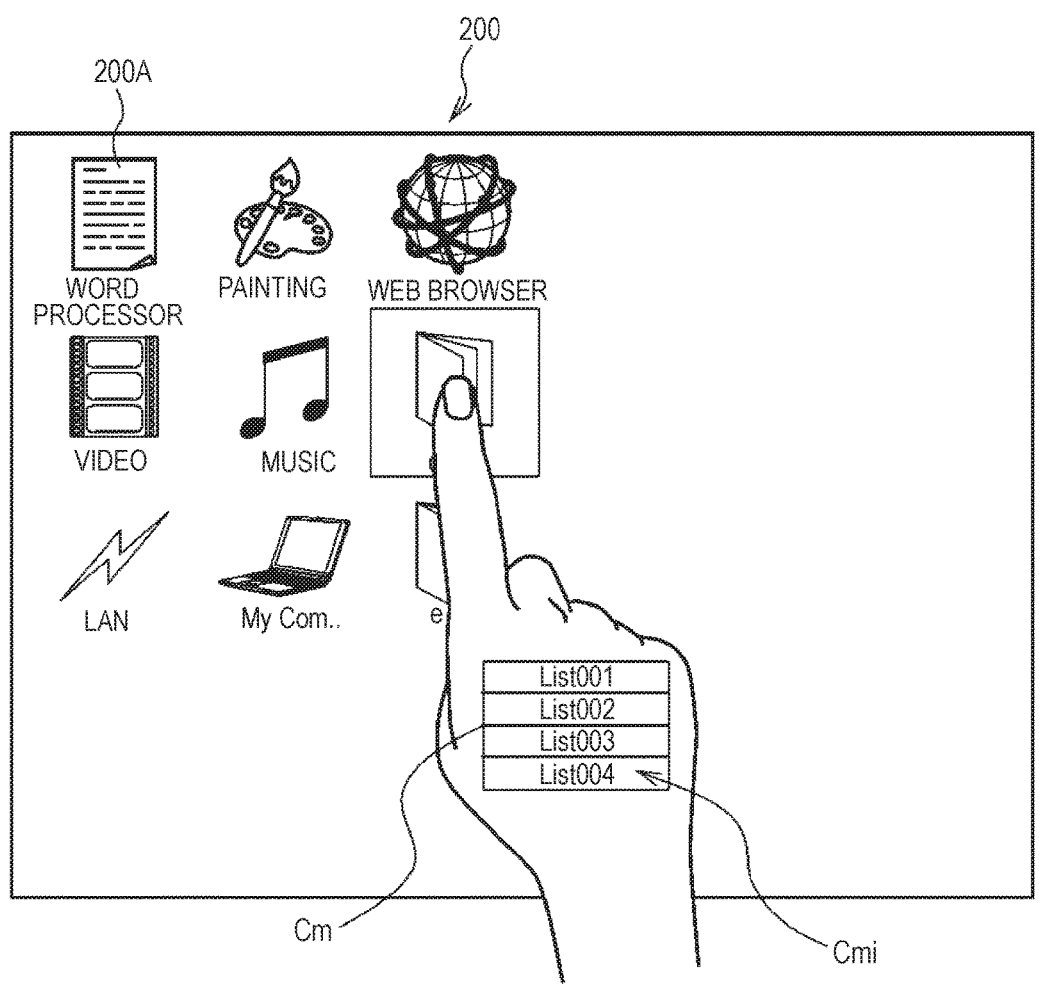
FIG. 19 is a rough diagram for explaining an operation input example (1) according to a second embodiment.

Here, assume that the user performs a gesture operation of touching a desired icon 200A by the tip of the index finger of the right hand on the projection surface 102A as shown in FIG. 19. Also in this case, the desk top screen 200 is not displayed on the hand in the same manner as the first embodiment.

At this time, the CPU 110 specifies a position of the tip of the index finger of the right hand based on the shape of the detected area of the hand. Then, the CPU 110 recognizes that the arbitrary icon 200A has been touched by the index finger of the right hand based on the position and arrangement of respective icons 200A.

Here, the CPU 110 controls the image processing unit 113 and the projection unit 116 to project an image of a context menu Cm of the touched icon 200A on the back of the right hand touching the icon 200A.

Specifically, the image processing unit 113 generates a composite image by combining the image of the context menu Cm with an image of the desk top screen 200 obtained by cutting the part inside the contour of the hand so that the image of the context menu Cm is positioned at the part of the back of the hand. Then, the composite image is projected on the screen 102 by the projection unit 116.

As a result, the image of the desk top screen 200 is displayed outside the hand existing on the projection surface 102A as well as the image of the context menu Cm is displayed on the back of the hand existing on the projection surface 102A.

The context menu Cm includes a list having plural rows, in which names of processing ("copy", "delete", "activation of applications" and so on) executable with respect to the touched icon 200A are displayed in respective rows at the center thereof as items Cmi.

Figure 20:
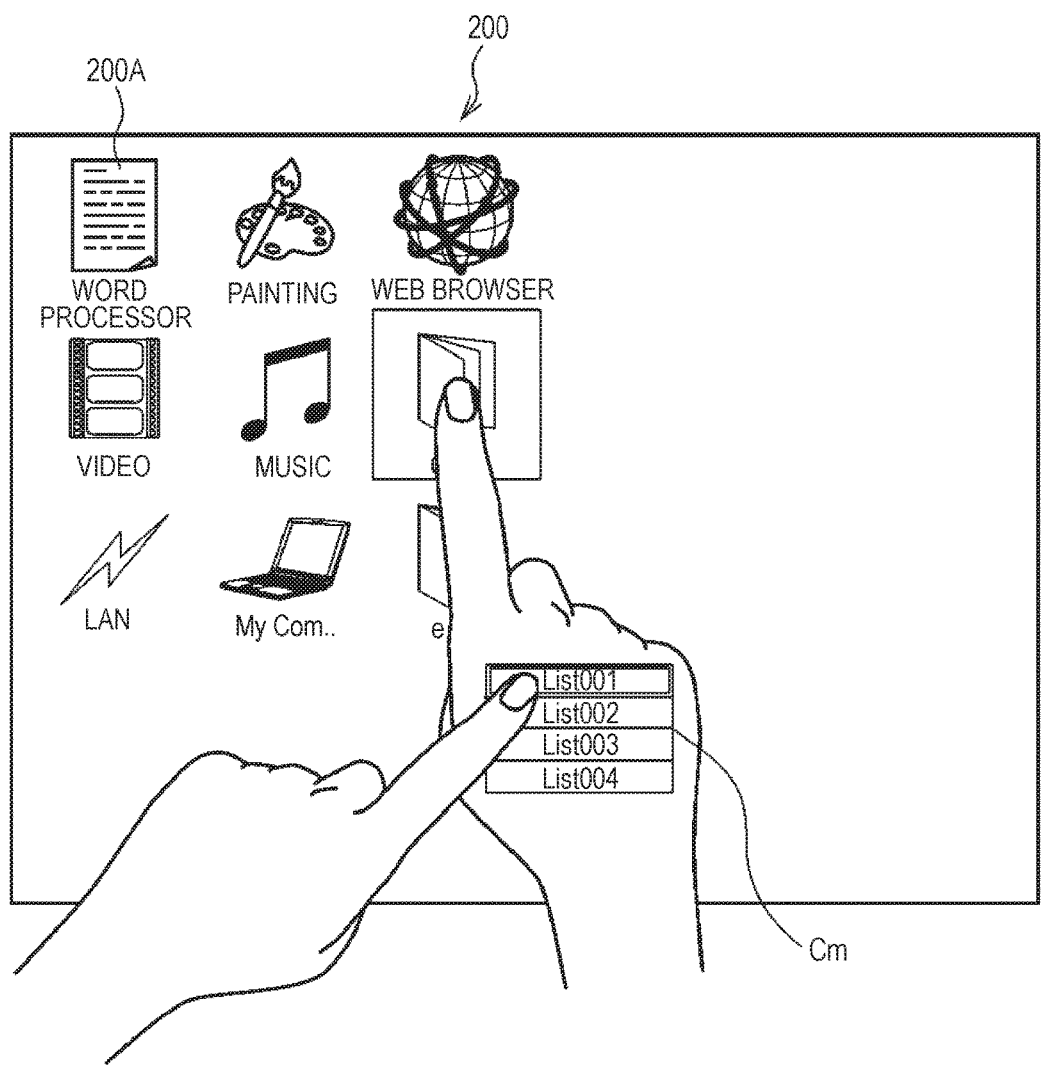
FIG. 20 is a rough diagram for explaining an operation input example (2) according to the second embodiment.

The projector device 101 is configured to execute processing corresponding to the item Cmi of a touched row when one of the rows of the context menu Cm displayed on the back of the hand is touched by a fingertip of the other hand as shown in FIG. 20.

Specifically, assume that the user touches one of the rows of the context menu Cm displayed on the back of the right hand by the tip of the index finger of the left hand while touching the icon 200A by the right hand.

At this time, the CPU 110 of the projector device 101 recognizes that one of the rows of the context menu Cm displayed on the back of the right hand has been touched by the left hand based on the shape of the detected area and movement of the hand. Then, the CPU 110 executes processing corresponding to the item Cmi of the touched row.

As described above, the projector device 101 allows the user to see the desk top screen 200 and the context menu Cm at the same time as well as in a state of being clearly separated by using the part of the back of the hand as a display area different from the projection surface 102A of the screen 102, namely, the display area for displaying the context menu Cm.

<4. Modification Examples>
[4-1. Modification Example 1]

In the above first embodiment, when a picture displayed on the page display area 203B of the Web browser screen 203 is continuously touched for a given period of time, the image is copied on the clip board.

Figure 21:
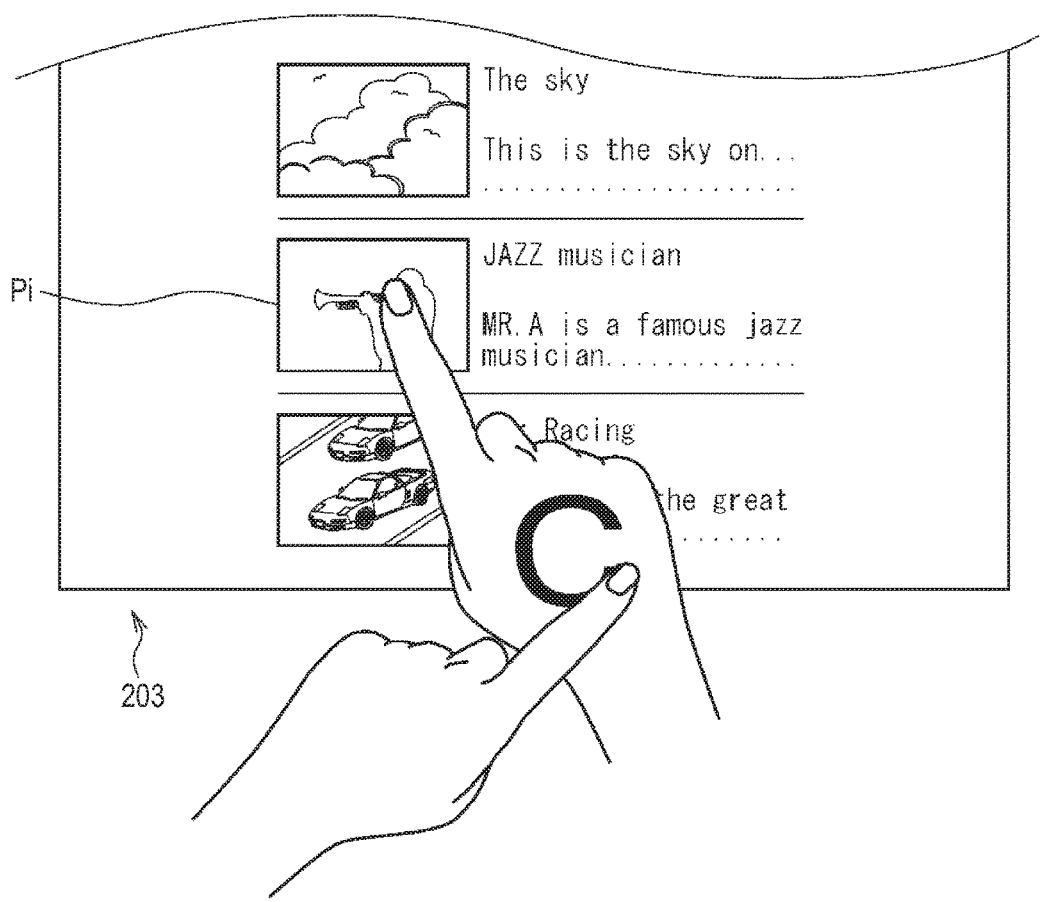
FIG. 21 is a rough diagram for explaining an operation input example (1) according to a modification example.

It is not limited to the above, and it is also preferable that the picture is copied on the clip board in accordance with execution of the gesture operation of drawing a letter "C" on the back of the right hand by the fingertip of the left hand while touching the image by the fingertip of the right hand as shown in FIG. 21.

Actually, assume that the user performs the gesture operation of drawing the letter "C" on the back of the right hand by the tip of the index finger of the left hand while touching a desired image displayed on the page display area 203B by the tip of the index finger of the right hand.

At this time, the CPU 110 of the projector device 101 recognizes that the letter "C" has been drawn on the back of the right hand touching the picture by the tip of the index finger of the left hand based on the detected shape of the area and movement of the hand.

Then, the CPU 110 controls the image processing unit 113 and the projection unit 116 to display the picture on the back of the right hand touching the picture. As a result, the picture is displayed on the back of the right hand touching the picture.

The CPU 110 also copies the picture on the clip board with the above processing. Thus, the desired image is copied.

It is also preferable that, for example, the icon 200A is copied in addition to the picture, in accordance with the execution of the gesture operation of drawing the letter "C" on the back of one hand by the other hand while touching the icon 200A arranged on the desk top screen 200 by one hand.

Though the operation corresponding to the copy is the gesture operation of drawing the letter "C" on the back of the hand, other various operations can be used as long as operations are associated with the copy.

[4-2. Modification Example 2]

In the above second embodiment, when the icon 200A is touched, the context menu Cm in which items Cmi are displayed at respective rows at the center thereof is projected on the back of the hand touching the icon 200A.

Here, it is also preferable that the items Cmi displayed at respective rows in the context menu Cm are displayed in a right-justified position or in a left-justified position seen from the user according to which of the right hand and the left hand touches the icon 200A.

Figure 22:
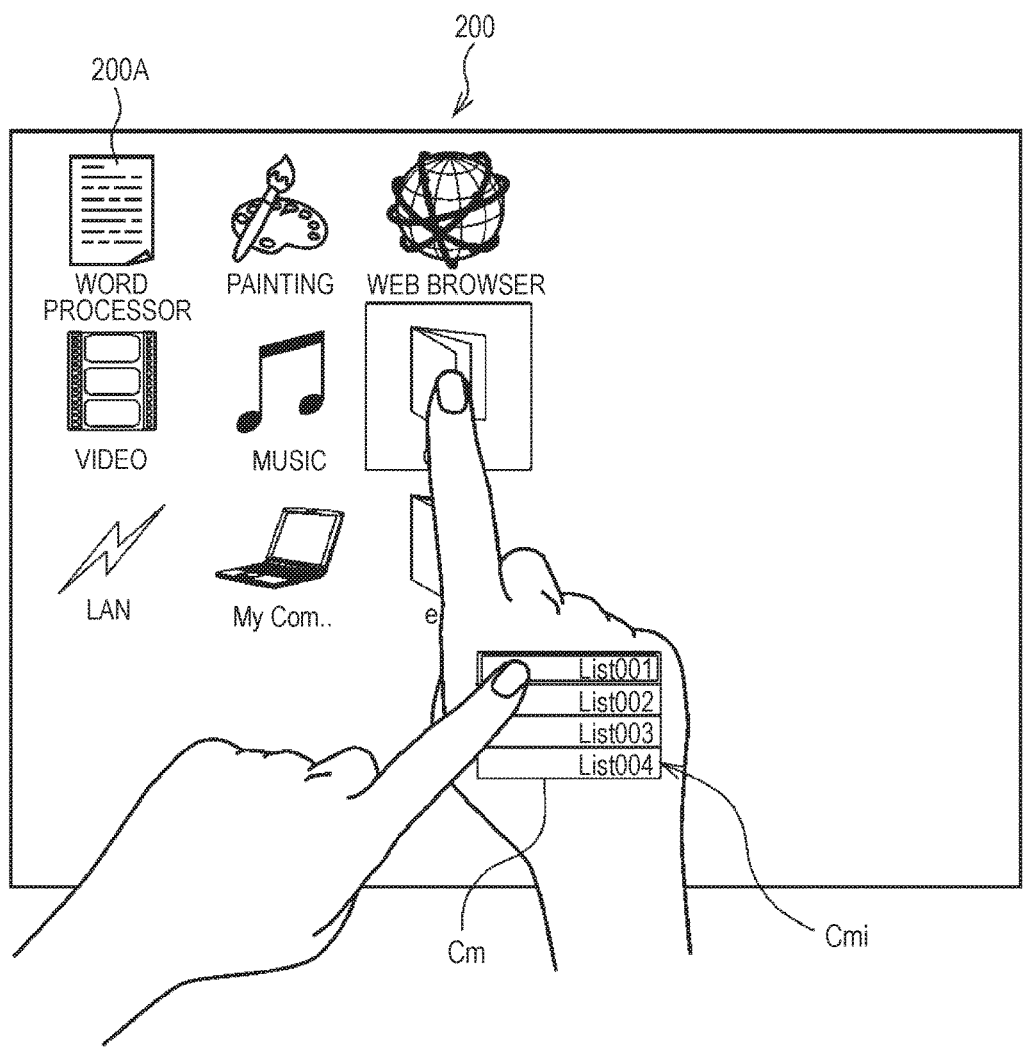
FIG. 22 is a rough diagram for explaining an operation input example (2) according to a modification example.

Specifically, the CPU 110 specifies which of the right hand and the left touches the icon 200A based on the shape of the detected area of the hand. Then, the CPU 110 projects the context menu Cm in which the items Cmi are displayed at respective rows in the right-justified position on the back of the right hand as shown in FIG. 22 when the hand touching the icon 200A is the right hand.

Thus, the projector device 101 can prevent the difficulty in seeing the items Cmi to be overlapped with the fingertip when one of the rows in the context menu Cm projected on the back of the right hand by the fingertip of the left hand.

On the other hand, when the hand touching the icon 200A is the left hand, the CPU 110 of the projector device 101 projects the context menu Cm in which the items Cmi are displayed at respective rows in the left-justified position on the back of the left hand.

Thus, the projector device 101 can prevent the difficulty in seeing the items Cmi to be overlapped with the fingertip when one of the rows in the context menu Cm projected on the back of the left hand by the fingertip of the right hand.

[4-3. Modification Example 3]

Furthermore, when the icon 200A arranged in the desk top screen 200 is touched, the context menu Cm of the icon 200A is projected on the back of the hand touching the icon 200A in the second embodiment.

Figure 23:
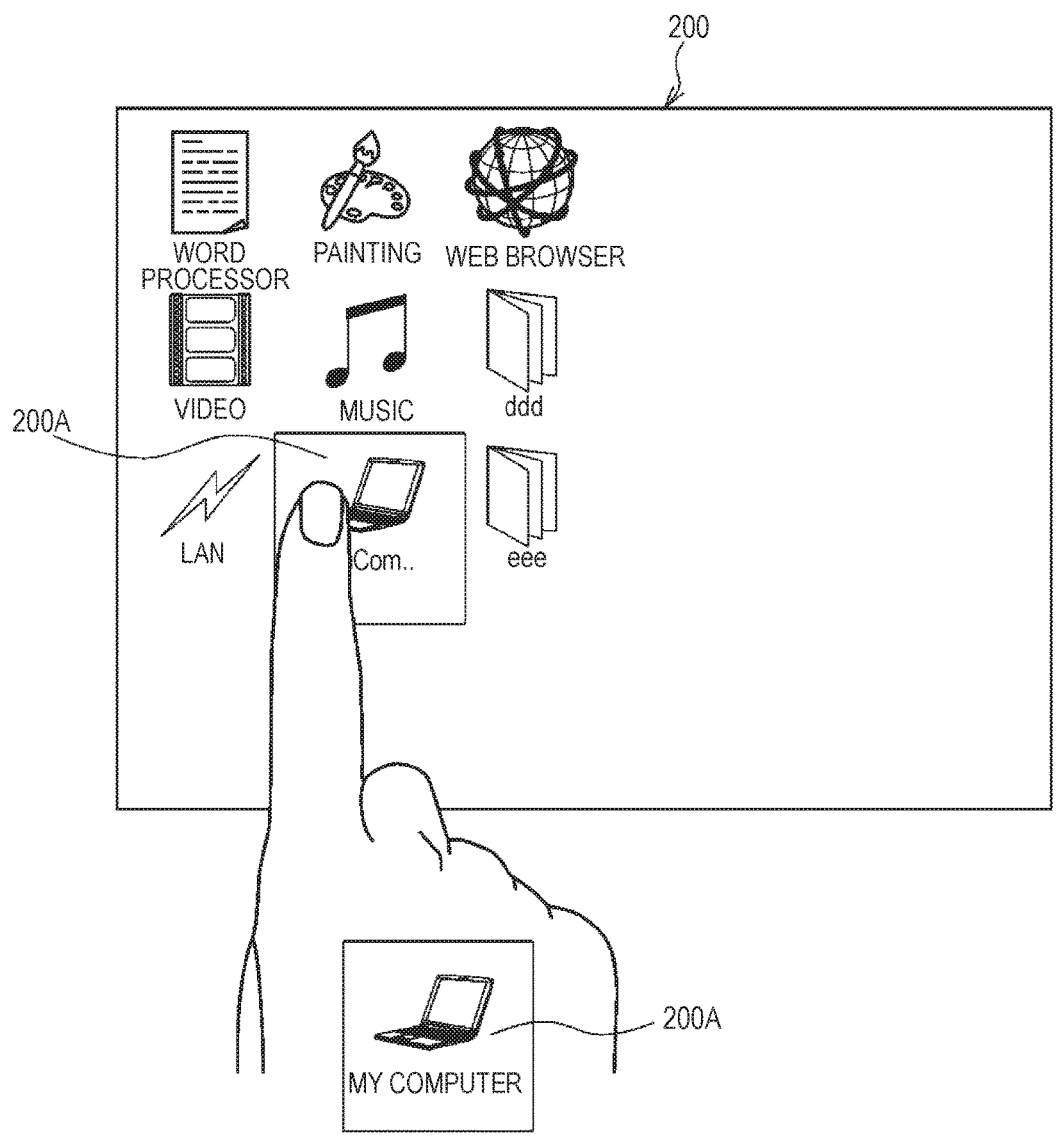
FIG. 23 is a rough diagram for explaining an operation input example (3) according to a modification example.

It is not limited to the above example, and for example, the icon 200A can be projected on the back of the hand touching the icon 200A when the icon 200A is touched as shown in FIG. 23. At this time, not only the icon 200A but also a name of the icon 200A is projected on the back of the hand.

Actually, names of the icons 200A are displayed just under respective icons 200A in the desk top screen 200A. The number of characters which can be displayed as the names is prescribed according to the layout of the desk top screen 200A.

Therefore, when the number of characters of the name of the icon 200A exceeds the number of characters which can be displayed, the name will be displayed in a state where characters outside the range are omitted.

Accordingly, when the icon 200A and the name thereof are displayed on the back of the hand which is generally a larger area than an area allocated to each icon 200A and the name thereof on the desk top screen 200, the entire name is displayed.

According to the above, it is possible to allow the user to check the entire name of a desired icon 200A easily.

It is also preferable that the icon 200A displayed on the back of the hand activates an application corresponding to the icon 200A when touched by the other hand.

The display of the icon 200A and the name thereof on the back of the hand as well as activation of the application can be executed under control by the CPU 110 of the projector device 101 in the same manner as the first and second embodiments.

[4-4. Modification Example 4]

Furthermore, when the icon 200A is touched, the context menu Cm in which the names of processing executable with respect to the icon 200A are displayed in a list is projected on the back of the hand touching the icon 200A in the second embodiment.

It is not limited to the above example, and it is also preferable to display other various types of sub-information relating to the icon 200A on the back of the hand touching the icon 200A when the icon 200A is touched.

For example, assume that an icon correspond to a play list showing the order of reproducing music pieces is arranged on the desk top screen 200. Here, when the icon is touched, the CPU 110 projects the play list corresponding to the icon on the back of the hand touching the icon.

Then, when one of names of music pieces written in the play list projected on the back of the hand is touched by the fingertip of the other hand, the CPU 110 reads out the music data corresponding to the name of the music piece, for example, from the non-volatile memory 111 and reproduces the music data. Audio obtained as the result of the reproduction is outputted, for example, through a not-shown output terminal.

[4-5. Modification Example 5]

Furthermore, when a body such as a hand exists on the projection surface 102A, the main image such as the desk top screen 200 or the word processor screen 201 is not projected on the area of the body in the above first and second embodiments.

It is not limited to the above example, and it is also preferable that the main image is projected within the area of the body with a color paler than the outside of the area of the body.

According to the above, a feeling as if a semi-transparent body is put on the screen can be given to the user.

It is not limited to the above example, and it is also preferable that the main image is projected within the area of the body, for example, with resolution lower than the outside of the area of the body.

As described above, the main image which has been processed so as not to be conspicuous as compared with the outside of the area of the body is projected within the area of the body.

[4-6. Modification Example 6]

Furthermore, the hand existing on the projection surface 102A is detected and a sub-image is projected on the hand in the above first and second embodiments.

It is not limited to the above, and for example, it is preferable that a plate made of plastic and the like is put on the projection surface 102A and the sub-image such as a gadget is projected thereon.

Also in this case, the CPU 110 of the projector device 101 can detect the plate by the same manner as in the case of the hand.

[4-7. Modification Example 7]

Furthermore, operation input is performed with respect to various objects (icons, the software keyboard, the color palette, hyper links and so on) arranged in the application screen by various touch operations in the above first and second embodiments. It is not limited to these operations and various types of operation input can be performed by different operations as the touch operation.

Specifically, for example, when the fingertip of the user is continuously positioned on a desired icon 200A arranged on the desk top screen 200 for a given period of time, the CPU 110 can recognize that the operation of selecting and determining the icon 200A has been performed.

Moreover, for example, when a fingertip of the user moves on an arbitrary key picture kp of the software keyboard Sk of the word processor screen 201, the CPU 110 can project the key picture kp on the back of the hand positioned on the key picture kp.

According to the above, operation input with respect to the application screen can be realized without calculating the distance between the hand and the projection surface 102A of the screen 102, as a result, processing load of the CPU 110 can be reduced.

[4-8. Modification Example 8]

Furthermore, whether there exists a body such as a hand on the projection surface 102A or not is determined as well as an area of the existing body is detected by comparing an image projected on the projection surface 102A of the screen 102 and an image obtained by imaging the projection surface 102A in the above embodiments.

It is not limited to the above and it is also preferable to determine whether there exists the body such as the hand on the projection surface 102A or not as well as to detect the area of the existing body by other various methods.

For example, it is also preferable to determine whether there exists the body such as the hand on the projection surface 102A or not as well as to detect the area of the existing body by analyzing the image obtained by imaging the projection surface 102A using existing image analysis techniques.

It should be noted that existing image analysis techniques may be used to detect objects within the image projected on the projection surface 102A. That is, the embodiments are not limited to detecting a body or object placed between the projector unit 104 and projection surface 102A, but rather, include detecting a body or object within the image projected on projection surface 102A. Accordingly, in each of the described embodiments, the body or object may be a body or object between the projector and surface, or may be a body or object within the image projected on the projection surface 102A.

Further, the embodiments are not limited to images formed by a projector. That is, in each of the described embodiments existing image analysis techniques may be used to detect objects within the image, regardless of whether or not the image is formed by a projector. Thus, the embodiments are not limited to detecting a body or object placed between a projector unit and a projection surface, or detecting a body or object within an image generated by a projector, but rather, include detecting a body or object within an image other than an image generated by a projector. Accordingly, in each of the described embodiments, the body or object may be a body or object between a projector and a projection surface, may be a body or object within an image generated by a projector, or may be a body or object within an image other than an image generated by a projector.

Figure 3:
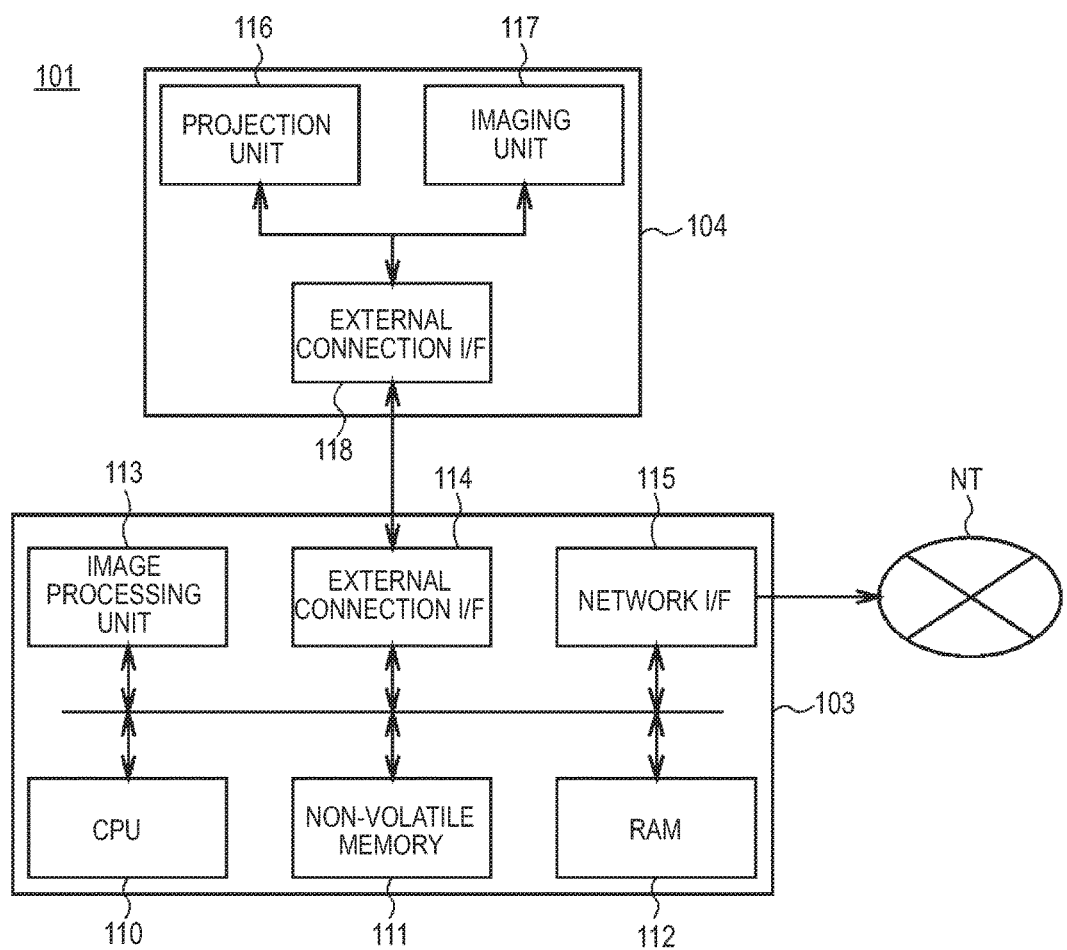
FIG. 3 is a block diagram showing a configuration of a projector device.

For example, elements 110-115 of FIG. 3 may be used apart from any projector for purposes of detecting an object in an image and superimposing a sub-image on the detected object. More specifically, an image may be received from a network source via network I/F 115 or from a another source connected to external connection I/F 114, either source being, for instance, a video storage, a computer, a camera, or a video display device. The received image may then be subject to analysis by image processing unit 113 and/or CPU 110. The image processing unit and/or CPU may apply existing image analysis techniques to detect an object within the received image. Upon detection of the object, the image processing unit and/or CPU may generate a sub-image to be superimposed on the detected object. In one such embodiment, the sub-image is superimposed by modifying the received image to generate a new image depicting the received image with the superimposed sub-image.

It is also preferable to determine whether there exists the body such as the hand on the projection surface 102A or not as well as to detect the area of the existing body based on detected results of plural infrared sensors by providing plural infrared sensors for measuring distance in an array on a surface facing the projection surface 102A of the projector unit 104.

When the infrared sensors arranged in the array are used, a distance between the projector unit 104 and the hand as well as a distance between the projector unit 104 and the projection surface 102A can be detected, and further, a distance between the hand and the projection surface 102 can be calculated based on these distances and an average thickness of the hand.

It is also possible to detect the back of the hand which is a relatively flat part on the surface of the hand more precisely by using the infrared sensors arranged in the array.

The detection of the back of the hand is also not limited to the above methods and other various methods can be used.

Furthermore, it is preferable to determine whether there exists the body such as the hand on the projection surface 102A or not as well as to detect the shape of the existing body by analyzing an image obtained by imaging the projection surface 102A using a stereo camera including two cameras provided on a surface corresponding to the projection surface 102A of the projector unit 104.

When the above stereo camera is used, the distance between the projector unit 104 and the hand and the distance between the projector unit 104 and the projection surface 102A can be detected, and further, the distance between the hand and the projection surface 102A can be calculated based on these distances and the average thickness of the hand.

[4-9. Modification Example 9]

Furthermore, the present disclosure is applied to the separated-type projector device 101 in which the main body 103 and the projector unit 104 are connected by the cable in the above first and second embodiments.

It is not limited to the above and it is also preferable that the present disclosure is applied to an integrated-type projector device 101 in which the function of the main body 103 is included in the projector unit 104.

Furthermore, the present disclosure is applied to the projector device 101 in which the screen 102 is placed on the desk and images are projected on the screen 102 from above the screen 102 in the above first and second embodiments.

It is not limited to this, and it is also preferable that, for example, the present disclosure is applied to the projector device 101 in which the screen 102 is set on a wall and images are projected on the screen 102 from the front of the screen 102.

In this case, the CPU 110 of the projector device 101 detects whether there exists a body in front of the projection surface 102A of the screen 102.

The present disclosure can be applied to other various types of projector devices, not limited to the above types of projector devices.

Furthermore, two images of the main image and the sub-image are projected by one projection unit 116 in the above first and second embodiments.

It is not limited to the above and it is also preferable that, for example, two projection units are provided and the main image is projected by one projection unit and the sub-image is projected by the other projection unit.

[4-10. Another Embodiment 10]

Furthermore, the projector device 101 as a projection device is provided with the projection unit 116 as a projection unit, the imaging unit 117 as a body detection unit, the image processing unit 113 as an image processing unit and a CPU 110 as the body detection unit and a control unit in the above first and second embodiments.

The present disclosure is not limited to the above examples and it is also preferable that respective function units (the projection unit, the body detection unit, the image processing unit and the control unit) of the projector device 101 are realized by other various configurations as long as these units have the same functions.

[4-11. Another Embodiment 11]

Furthermore, programs for executing various processing are written in the non-volatile memory 111 of the main body 103 in the above first and second embodiments.

It is not limited to this and it is preferable that the body unit 103 is provided with a drive for storage media such as an optical disk and a memory card, and that the CPU 110 reads out a program from the storage media through the drive and executes the program. It is also preferable that the CPU 110 installs the program read from the storage media in the non-volatile memory 111. Moreover, the CPU 110 can download the program from an apparatus on a network through the network I/F 115 and install the program in the non-volatile memory 111.

[4-12. Another Embodiment 12]

Furthermore, the present disclosure is not limited to the above first and second embodiment as well as modification examples. That is, the present disclosure can be applied to forms in which parts or all of the first and second embodiments as well as modification examples are arbitrarily combined or forms in which parts of them are extracted.

The present disclosure can be widely used for a projector and so on which project images on a screen.

It should be understood by those skilled in the art that various modifications, combinations, sub-combinations and alterations may occur depending on design requirements and other factors insofar as they are within the scope of the appended claims or the equivalents thereof.

For example, the present technology can adopt the following configurations.

(1) A projection device including:
a projection unit projecting a main image on a projection target member;
a body detection unit detecting a body existing between the projection unit and the projection target member;
an image processing unit performing processing to the main image so that the main image is not projected as it is on the body detected by the body detection unit; and
a control unit controlling the projection unit.

(2) The projection device according to (1),
wherein the image processing unit performs processing of cutting a part to be projected on the body detected by the body detection unit, and
the control unit controls the projection unit to project the main image obtained by cutting the part to be projected on the body on the projection target member.

(3) The projection device according to (1),
wherein the image processing unit performs processing of tinting a part of the main image to be projected on the body detected by the body detection unit with a paler color than other parts, and
the control unit controls the projection unit to project the main image in which the part to be projected on the body is tinted with a paler color than the other parts of the body on the projection target member.

(4) The projection device according to (2),
wherein the body detection unit detects the body existing between the projection unit and the projection target member by comparing an image obtained by imaging the projection target member with the main image projected on the projection target member.

(5) The projection device according to (2),
wherein the body detection unit detects the body existing between the projection unit and the projection target member by analyzing the image obtained by imaging the image projection member.

(6) The projection device according to (4),
wherein the control unit controls the projection unit to project a sub-image different from the main image on the body detected by the body detection unit.

(7) The projection device according to (6),
wherein the body detection unit detects a hand of a user as the body existing between the projection unit and the projection target member.

(8) The projection device according to (7),
wherein the control unit controls the projection unit to project the sub-image on the back of the hand detected by the body detection unit.

(9) The projection device according to (8),
wherein the body detection unit detects a movement of the user's hand existing between the projection unit and the projection member body and
the control unit executes various processing in accordance with the movement of the hand detected by the body detection unit.

(10) The projection device according to (9),
wherein the control unit controls the projection unit to project an image of a given screen on the projection target member as the main image and executes processing corresponding to an operation of an object when a movement of the hand operating the object arranged on the given screen is detected by the body detection unit.

(11) The projection device according to (10),
wherein the control unit controls the projection unit to project an image corresponding to the operation of the object on the back of the hand as the sub-image when the movement of the hand operating the object arranged on the given screen is detected by the body detection unit.

(12) The projection device according to (11),
wherein the control unit executes processing corresponding to an operation of the sub-image when a movement of the hand operating the sub-image projected on the back of the hand by the other hand is detected by the body detection unit.

(13) The projection device according to (9),
wherein the control unit controls the projection unit to project an image of a given screen on the projection target member as the main image, and
when a movement of a hand selecting an object arranged on the given screen is detected and a movement of the other hand performing a given gesture operation with respect to the hand selecting the object is further detected, the control unit executes processing corresponding to the gesture operation with respect to the object.

(14) A projection method including:
controlling a projection unit by a control unit to project a main image on a projection target member;
detecting a body existing between the projection unit and the projection target member by a body detection unit; and
performing processing to the main image by the body detection unit so that the main image is not projected as it is on the body detected in the detection process.

(15) A projection program for allowing a projection device to execute:
controlling a projection unit by a control unit to project a main image on a projection target member;
detecting a body existing between the projection unit and the projection target member by a body detection unit; and
performing processing to the main image by the body detection unit so that the main image is not projected as it is on the body detected in the detection process.

What is claimed is:

1. An information processing apparatus comprising:
a processor configured to:
output a first information to display a first image over a first object in a three-dimensional space;
acquire a first result of detection of a first user operation;
generate a second image associated with the first image based on the first result;
output a second information to display the second image at a position associated with a user's hand;
acquire a second result of detection of a second user operation to the second image; and
control to change the second image based on the second result, wherein the second user operation is operated by a second object.

2. The apparatus of claim 1, wherein the position associated with the user's hand is a position of a surface of or extending from the user's hand.

3. The apparatus of claim 1, wherein the second object is the user's another hand.

4. The apparatus of claim 1, wherein the second image is associated with a part of the first image which is designated based on the first user operation.

5. The apparatus of claim 1, wherein the second user operation is a selection operation from candidate items.

6. The apparatus of claim 5, wherein the selection operation includes a pointing operation.

7. The apparatus of claim 5, wherein the selection operation includes a touch operation.

8. The apparatus of claim 5, wherein the second image is changed at a part associated with a selected item of the candidate items.

9. The apparatus of claim 8, wherein the second image is changed at a part of an image of the selected item.

10. The apparatus of claim 9, wherein the second image is changed at a frame of the selected item.

11. The apparatus of claim 5, wherein the second image is changed at a first candidate item of the candidate items.

12. The apparatus of claim 11, wherein the second image is changed at a frame of the first candidate item.

13. The apparatus of claim 1, further comprising:
a projector, wherein the projector acquires the first information and the second information.

14. The apparatus of claim 1, wherein display of the second image is changed from a first position to a second position based on the second result.

15. The apparatus of claim 14, wherein the second position is other than over the user's hand.

16. The apparatus of claim 14, wherein the second user operation includes a touch operation.

17. The apparatus of claim 14, wherein the second object is the user's another hand.

18. The apparatus of claim 1, wherein the position associated with the user's hand is a position over the user's hand.

* * * * *